United States Patent
Lu et al.

(10) Patent No.: US 8,245,405 B2
(45) Date of Patent: Aug. 21, 2012

(54) CABLE ACCESS TOOL AND METHOD OF USE

(75) Inventors: Yu Lu, Eden Prairie, MN (US); Mark D. Narum, Minnetonka, MN (US); Paul Suek, Eden Prairie, MN (US); Scott Carlson, Bloomington, MN (US); Bernard Dietzler, Bloomington, MN (US); Erik Gronvall, Bloomington, MN (US)

(73) Assignee: ADC Telecommunications, Inc., Eden Praire, MN (US)

( * ) Notice: Subject to any disclaimer, the term of this patent is extended or adjusted under 35 U.S.C. 154(b) by 856 days.

(21) Appl. No.: 12/252,847

(22) Filed: Oct. 16, 2008

(65) Prior Publication Data
US 2009/0151167 A1 Jun. 18, 2009

Related U.S. Application Data

(60) Provisional application No. 60/980,224, filed on Oct. 16, 2007.

(51) Int. Cl.
*B26B 27/00* (2006.01)
(52) U.S. Cl. ............... 30/90.4; 30/90.1; 30/91.2; 81/9.4; 83/746; 83/613
(58) Field of Classification Search ................ 30/90.8, 30/90.4, 90.1, 91.1, 91.2; 81/9.51, 9.4, 9.41, 81/9.42, 9.43; 83/746, 523, 613, 697
See application file for complete search history.

(56) References Cited

U.S. PATENT DOCUMENTS

| | | | |
|---|---|---|---|
| 3,318,352 A * | 5/1967 | Seltzer ..................... 269/288 |
| 4,706,384 A * | 11/1987 | Schreiber et al. ............. 30/91.2 |
| 4,947,549 A | 8/1990 | Genovese et al. |
| 4,955,137 A | 9/1990 | Matthews |
| 4,961,623 A | 10/1990 | Midkiff et al. |
| 4,972,581 A | 11/1990 | McCollum et al. |
| 5,050,302 A | 9/1991 | Mills |
| 5,093,992 A | 3/1992 | Temple, Jr. et al. |
| 5,125,060 A | 6/1992 | Edmundson |
| 5,140,751 A | 8/1992 | Faust |
| 5,172,620 A | 12/1992 | Faust |
| 5,210,812 A | 5/1993 | Nilsson et al. |
| 5,443,536 A | 8/1995 | Kiritsy et al. |
| 5,577,150 A | 11/1996 | Holder et al. |
| 5,604,834 A | 2/1997 | Beasley, Jr. et al. |
| 5,613,300 A | 3/1997 | Schmidt |
| 5,822,863 A | 10/1998 | Ott |
| 6,007,413 A | 12/1999 | Fitz |
| 6,023,844 A | 2/2000 | Hinson, II et al. |
| 6,029,355 A * | 2/2000 | Carlin ........................ 30/92.5 |
| 6,035,088 A | 3/2000 | Chandraiah et al. |
| 6,044,744 A | 4/2000 | Eslambolchi et al. |
| 6,091,875 A | 7/2000 | Lindsay, Jr. et al. |

(Continued)

OTHER PUBLICATIONS

Alcatel 6652 Buffer Tube Access Tool, http://www.alcatel.com, 2 pages (Apr. 2003).

(Continued)

*Primary Examiner* — Phong Nguyen
(74) *Attorney, Agent, or Firm* — Merchant & Gould P.C.

(57) ABSTRACT

A tool and method for accurately and efficiently cutting through a jacket of a fiber optic cable at a break-out location. The tool securely holds the fiber optic cable and accurately controls the depth and length of cut(s). In addition, the tool accurately positions the cut(s) both in relation to the fiber optic cable and in relation to other cuts.

11 Claims, 24 Drawing Sheets

U.S. PATENT DOCUMENTS

| | | | |
|---|---|---|---|
| 6,164,163 | A | 12/2000 | Lesueur et al. |
| 6,273,990 | B1 | 8/2001 | Bookbinder et al. |
| 6,311,581 | B1 | 11/2001 | Hsieh |
| 6,581,291 | B1 | 6/2003 | Tarpill et al. |
| 6,591,501 | B1 | 7/2003 | Phillips |
| 6,637,112 | B2 | 10/2003 | Davis |
| 7,127,143 | B2 | 10/2006 | Elkins, II et al. |
| 7,251,411 | B1 | 7/2007 | Lu et al. |
| 7,454,106 | B2 | 11/2008 | Cobb, III et al. |
| 7,620,286 | B2 | 11/2009 | Lu et al. |
| 2005/0016346 | A1* | 1/2005 | Ricci ............ 83/523 |
| 2005/0044715 | A1 | 3/2005 | Shutts et al. |
| 2006/0053996 | A1* | 3/2006 | Sobel et al. ......... 83/614 |
| 2006/0130338 | A1 | 6/2006 | Dzubak et al. |
| 2007/0199197 | A1* | 8/2007 | Schmode et al. ...... 30/90.1 |
| 2009/0022460 | A1 | 1/2009 | Lu et al. |

OTHER PUBLICATIONS

Alwayn, V., *Fiber Optic Technologies*, Cisco Press, http://www.ciscopress.com, 4 pages (Apr. 23, 2004).

Buffer Tube Access Tool Kit Quick and Easy Access to Fibers Anytime, *Specialized Products Company*, 3 pages (2005).

Buffer Tube Fan-Out Kits, *Corning Cable Systems*, http://www.corning.com/cablesystems, 2 pages (Aug. 2002).

Buffer Tube Stripper, *FiberOptic Supply*, internet site, 1 page (Publicly known at least as early as Jun. 7, 2006).

Cable Jacket/Buffer Tube Stripper, Metrotek,, Internet site, 1 page (Publicly known at least as early as Jun. 7, 2006).

Core Tube Slitters, *CESI*, internet site, 3 pages (Publicly known at least as early as Jun. 7, 2006).

Corning Cable Systems, SRP-004-026, Issue 4, *No-Slack Optical Fiber Access Tool (NOFAT)*, 6 pages (Apr. 2005).

Jacket Removal Procedure for Outside Plant Cable, *Berk-Tek*, 4 pages (May 16, 2000).

New FTTx Tool Kit from FIS, *Fiber Instrument Sales Inc.*, 1 page (2005).

Stanley Hand Tools Catalog Knives, pp. 30-39 (Publicly known at least as early as May 17, 2006).

* cited by examiner

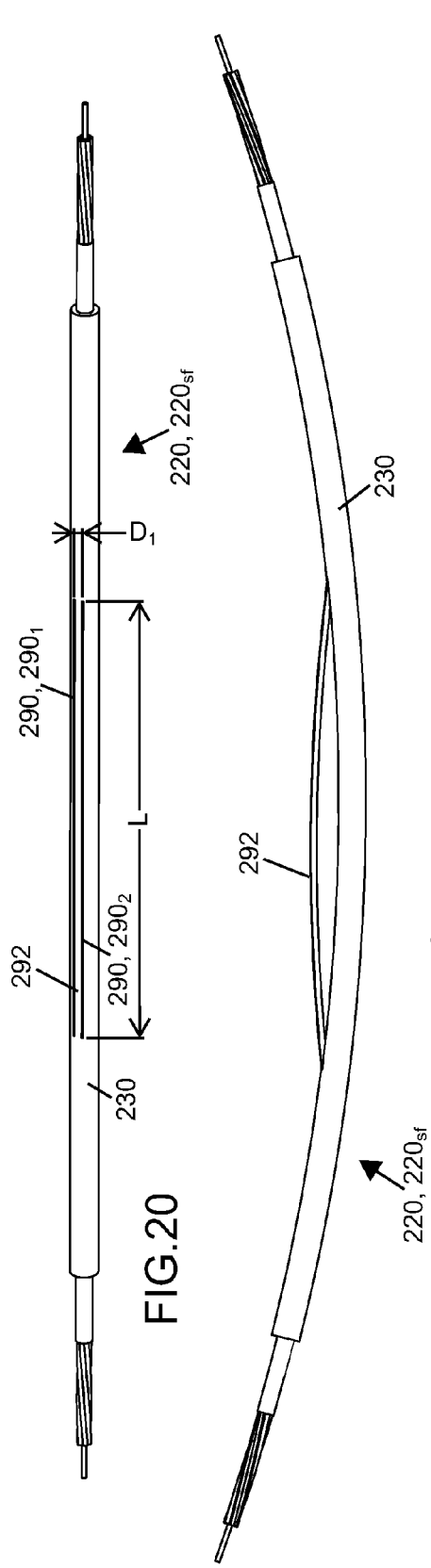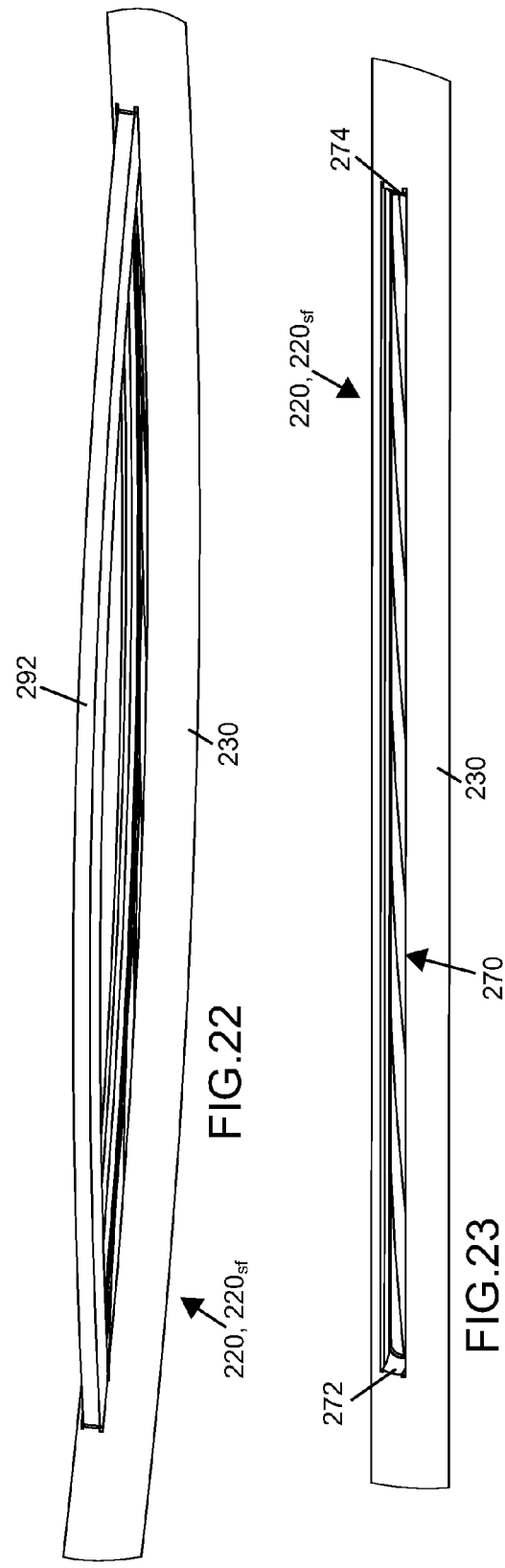
FIG.20 FIG.21 FIG.22 FIG.23

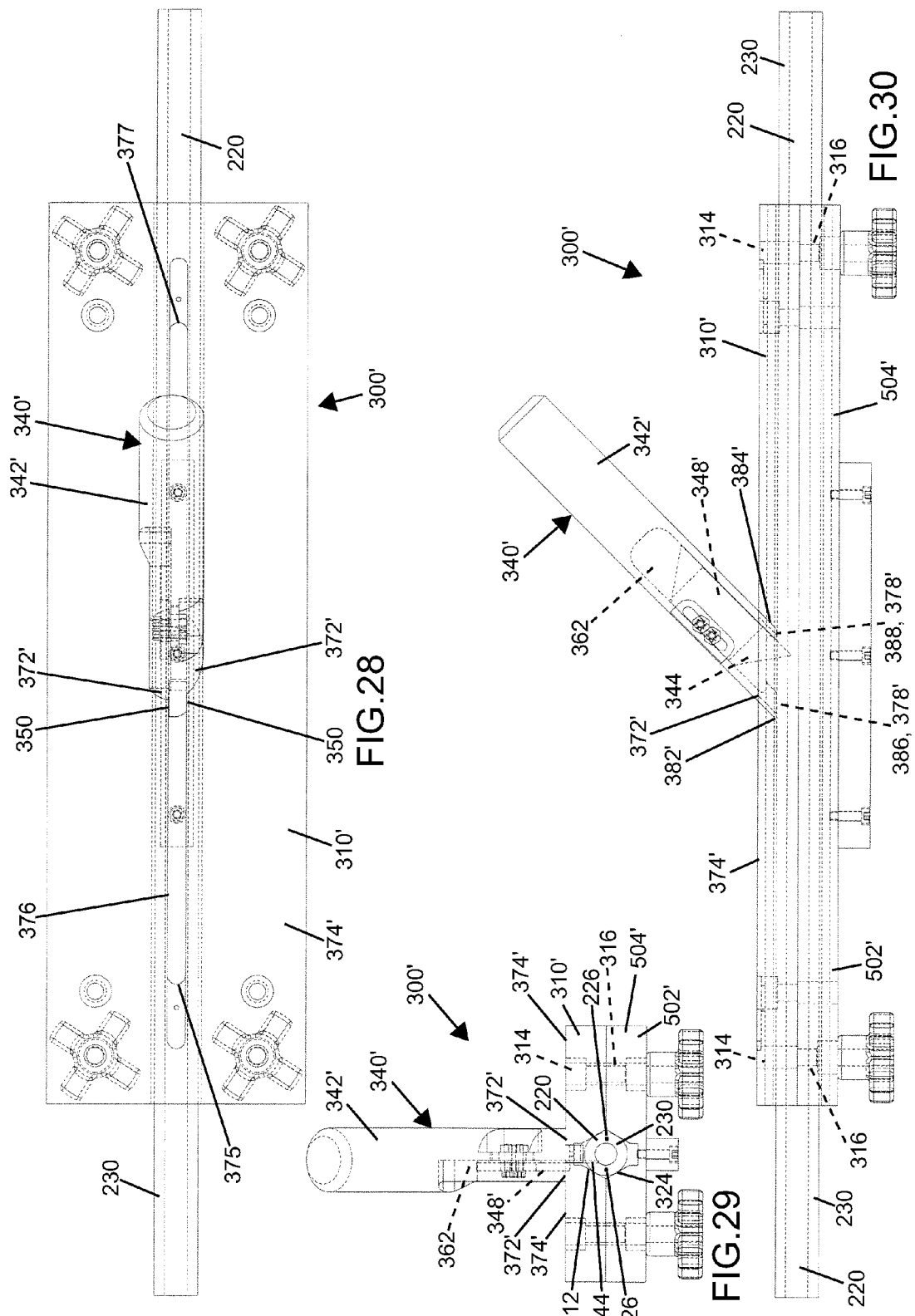

CABLE ACCESS TOOL AND METHOD OF USE

CROSS REFERENCE TO RELATED APPLICATIONS

This application claims priority from provisional application Ser. No. 60/980,224, filed Oct. 16, 2007, and which is incorporated herein by reference.

TECHNICAL FIELD

The principles disclosed herein relate to fiber optic cable systems. More particularly, the present disclosure relates to manufacturing fiber optic cable systems having main cables and branch cables.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown in FIG. 1, the network 100 may include a central office 110 that connects a number of end subscribers 115 (also called end users 115 herein) in a network. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits (e.g., see conduit 105).

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations may include fewer or more fibers. The portion of network 100 that includes an FDH 130 and a number of end users 115 may be referred to as an F2 portion of network 100. Splitters used in an FDH 130 may accept a feeder cable having a number of fibers and may split those incoming fibers into, for example, 216 to 432 individual distribution fibers that may be associated with a like number of end user 115 locations.

Referring to FIG. 1, the network 100 includes a plurality of break-out locations 125 at which branch cables 122 are separated out from main cable lines 120. Break-out locations 125 can also be referred to as tap locations, drop cable locations, splice locations or branch locations. Branch cables 122 can also be referred to as drop cables, drop lines, break-out cables or stub cables. Branch cables 122 are often connected to drop terminals 104 that include connector interfaces for facilitating coupling the fibers of the branch cables 122 to a plurality of different subscriber locations.

Branch cables 122 can manually be separated out from a main cable 120 in the field using field splices. Field splices are typically housed within sealed splice enclosures. Manual splicing in the field is time consuming and expensive.

Pre-terminated cable systems include factory integrated break-out locations 125 manufactured at predetermined positions along the length of a main cable 120 (e.g., see U.S. Pat. Nos. 4,961,623; 5,125,060; and 5,210,812).

The break-out location 125 is typically prepared by cutting into the main cable 120 to gain access to one or more fibers. This cutting process is delicate in that inadvertently cutting one or more of the fibers within the main cable 120 can damage the main cable 120. The fibers within the main cable 120 are often in close proximity to the cutting location. In addition, the main cable 120 is often made of a material or materials that are difficult to cut. There is a need for a cable access tool and method capable of cutting into such cables with adequate precision and cutting power. Furthermore, the cutting tool is preferably easy to use and produces repeatable results. The present disclosure satisfies these and other needs.

SUMMARY

Certain aspects of the disclosure relate to fiber optic cable systems and their manufacture. In particular, a cable access tool and method of use are disclosed that are beneficial in preparing a break-out location along a fiber optic cable. The cable access tool and method provide a means for accurately and efficiently cutting through a jacket of the fiber optic cable at the break-out location. Furthermore, the cable access tool and method will not damage optical fibers located within the fiber optic cable when properly implemented. The break-out location may be further prepared and fitted with a branch fiber optic cable.

The cable access tool provides a means to securely hold the fiber optic cable and to cut through the jacket of the fiber optic cable resulting in one or more cuts through the jacket. A means of accurately controlling a depth and length of the cut(s) are provided. In addition, a means of accurately positioning the cut(s) both in relation to the fiber optic cable and in relation to other cuts is provided.

A variety of additional aspects will be set forth in the description that follows. The aspects can relate to individual features and to combinations of features. It is to be understood that both the forgoing general description and the following detailed description are exemplary and explanatory only and are not restrictive of the broad concepts upon which the embodiments disclosed herein are based.

BRIEF DESCRIPTION OF THE DRAWINGS

FIG. 20 is a perspective view of the cut distribution cable of FIG. 16 illustrating a length, L, and a width, $D_1$, of the cut region;

FIG. 21 is a side elevation view of the cut distribution cable of FIG. 16 bent to outwardly buckle and separate a cut-away strip of the cut jacket relative to the distribution cable;

FIG. 22 is an enlarged perspective view of the cut distribution cable of FIG. 16 bent to outwardly buckle and separate the cut-away strip of the cut jacket relative to the distribution cable;

FIG. 23 is an enlarged perspective view of the cut distribution cable of FIG. 16 with the cut-away strip removed;

FIG. 28 is a top view of another cable access tool adapted for use with one of the distribution cables (also shown) of FIG. 7;

FIG. 29 is a front view of the cable access tool and the distribution cable of FIG. 28; and FIG. 30 is a side view of the cable access tool and the distribution cable of FIG. 28.

DETAILED DESCRIPTION

The present disclosure relates to manufacturing mid-span break-out arrangements provided on distribution cables 220. Each break-out arrangement is provided at a break-out location to protect the optical coupling of a tether to the distribution cable 220. A typical distribution cable includes a relatively large number of fibers (e.g., 72, 144, or more fibers). The fibers are typically organized within ribbons in a central portion of the distribution cable. Alternatively, the fibers may be arranged within multiple buffer tubes which themselves are organized in a central portion of an alternative distribution cable.

Figure 1:
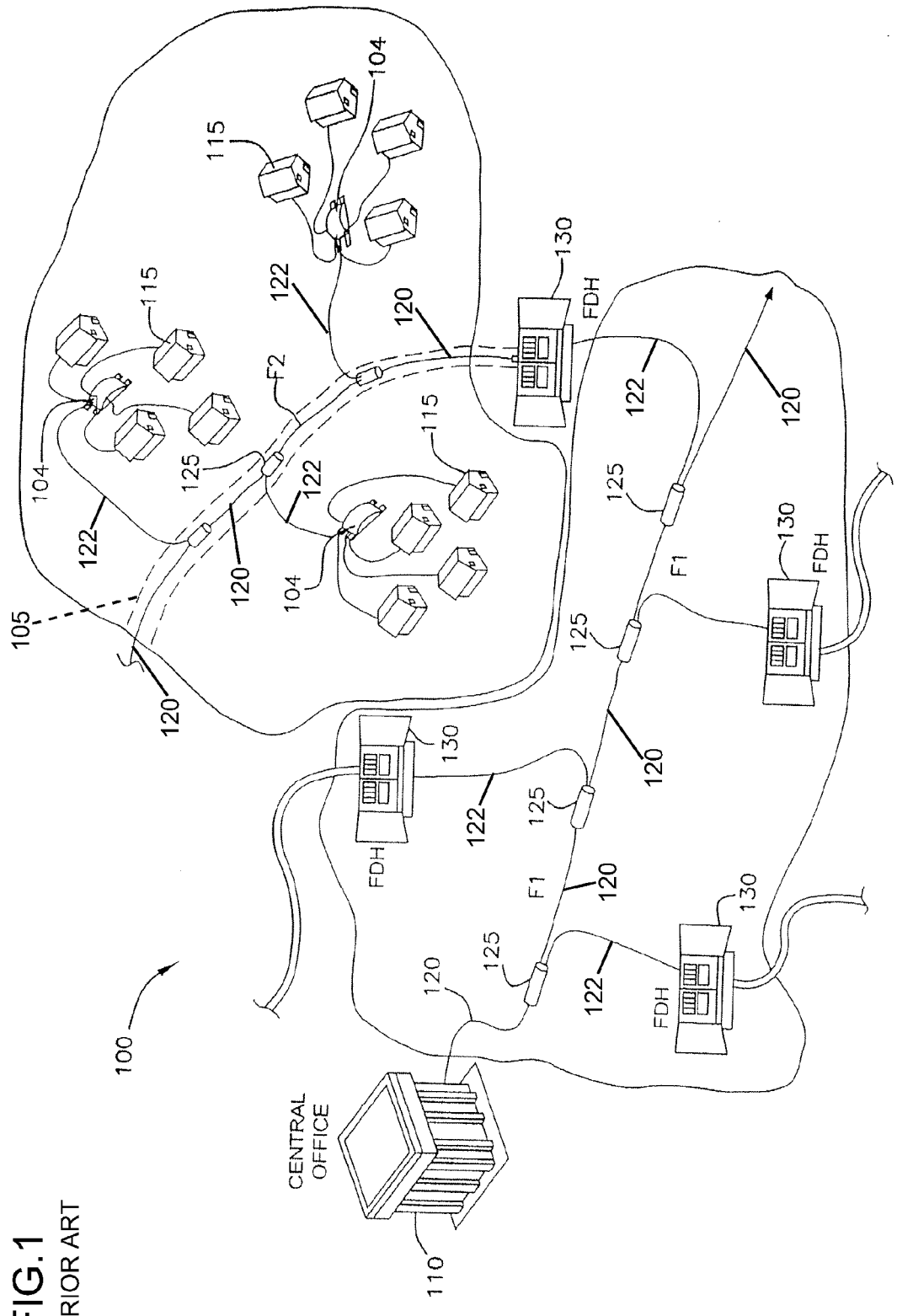
FIG. 1 illustrates a prior art passive fiber optic network.
Figure 2:
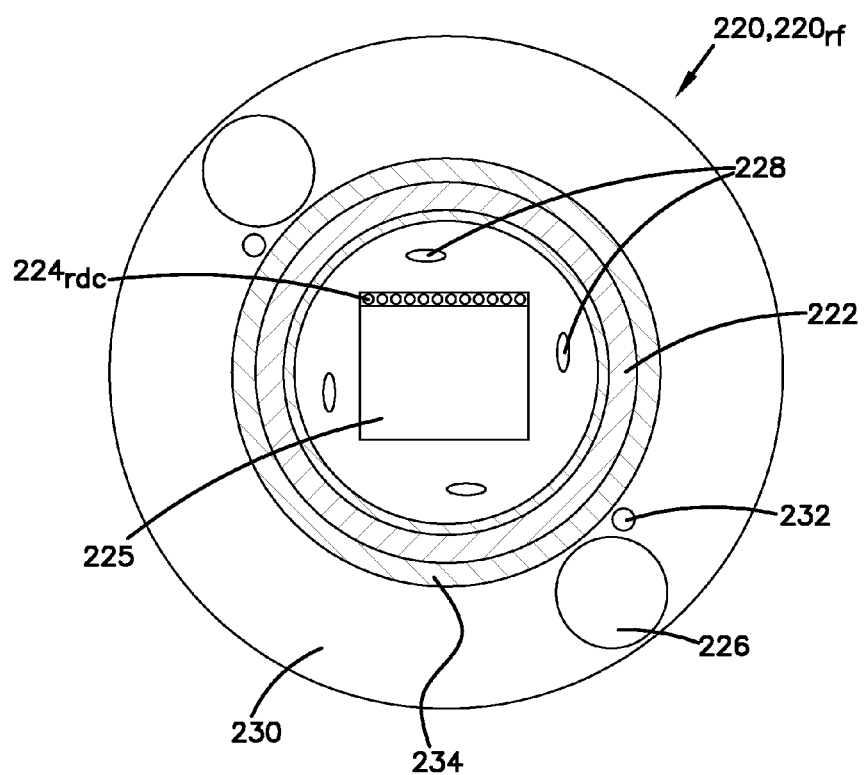
FIG. 2 is a cross-sectional view of a prior art example distribution cable including a central buffer tube enclosing a ribbon stack.

For example, FIG. 2 shows an example distribution cable $220_{rf}$ including a central buffer tube 222 enclosing a ribbon stack 225. Typically, the ribbon stack 225 includes approximately twelve ribbons and each ribbon contains about twelve fibers $224_{rdc}$. For clarity, only twelve fibers $224_{rdc}$ in the ribbon stack 225 are shown. The buffer tube 222 may include dry, water-blocking materials 228, such as yarn and/or tape. The distribution cable $220_{rf}$ also includes at least one, and preferably two, strength members 226 (e.g., flexible rods formed by glass fiber reinforced epoxy) for reinforcing the cable $220_{rf}$. The distribution cable $220_{rf}$ further includes an outer jacket 230 that encloses the ribbon stack 225 and the strength members 226. An outer strength layer structure 234, such as aramid fiber/yarn (e.g., Kevlar®), can surround the single buffer tube 222 within the jacket 230. Ripcords 232 can be provided for facilitating tearing away portions of the jacket 230 to access the fibers $224_{rdc}$ of the ribbon stack 225 within the jacket 230.

Figure 3:
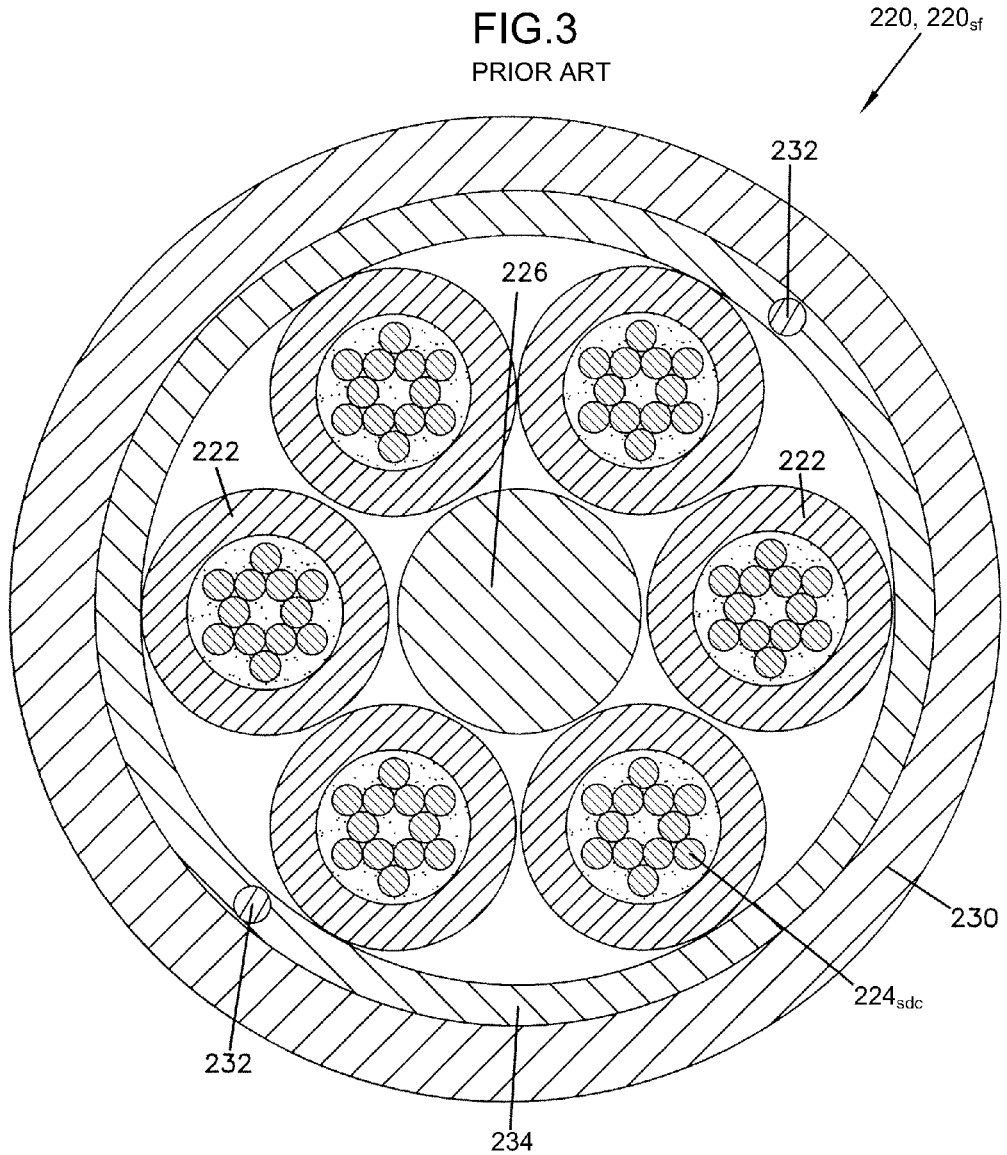
FIG. 3 is a cross-sectional view of another prior art example distribution cable including six separate buffer tubes each containing twelve optical fibers.

FIG. 3 shows an alternative example distribution cable $220_{sf}$ including multiple buffer tubes 222 each enclosing one or more separate fibers $224_{sdc}$. The alternative example distribution cable $220_{sf}$ may also include one or more strength members 226 and/or ripcords 232 and may also have an outer strength layer structure 234 all enclosed by an outer jacket 230.

Figure 4:
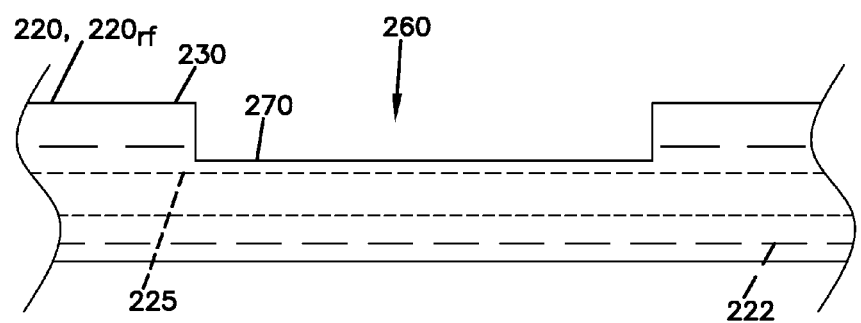
FIG. 4 is a side view of the distribution cable of FIG. 2 having a cut region.

A typical mid-span break-out location 260 is provided at an intermediate point along the length of a distribution cable 220 (e.g., see FIG. 4). Commonly a tether (e.g., a drop cable or a stub cable) branches out from the distribution cable at the break-out location 260. The tether most commonly has a fewer number of fibers as compared to the number of fibers provided within the distribution cable. In an example embodiment, the tether has no more than twelve fibers. The tether includes fibers that extend between first and second ends. The first ends of the tether fibers are preferably spliced to selected fibers of the distribution cable 220 at the break-out location 260. The second ends of the tether fibers can either be connectorized or unconnectorized.

Figure 6:
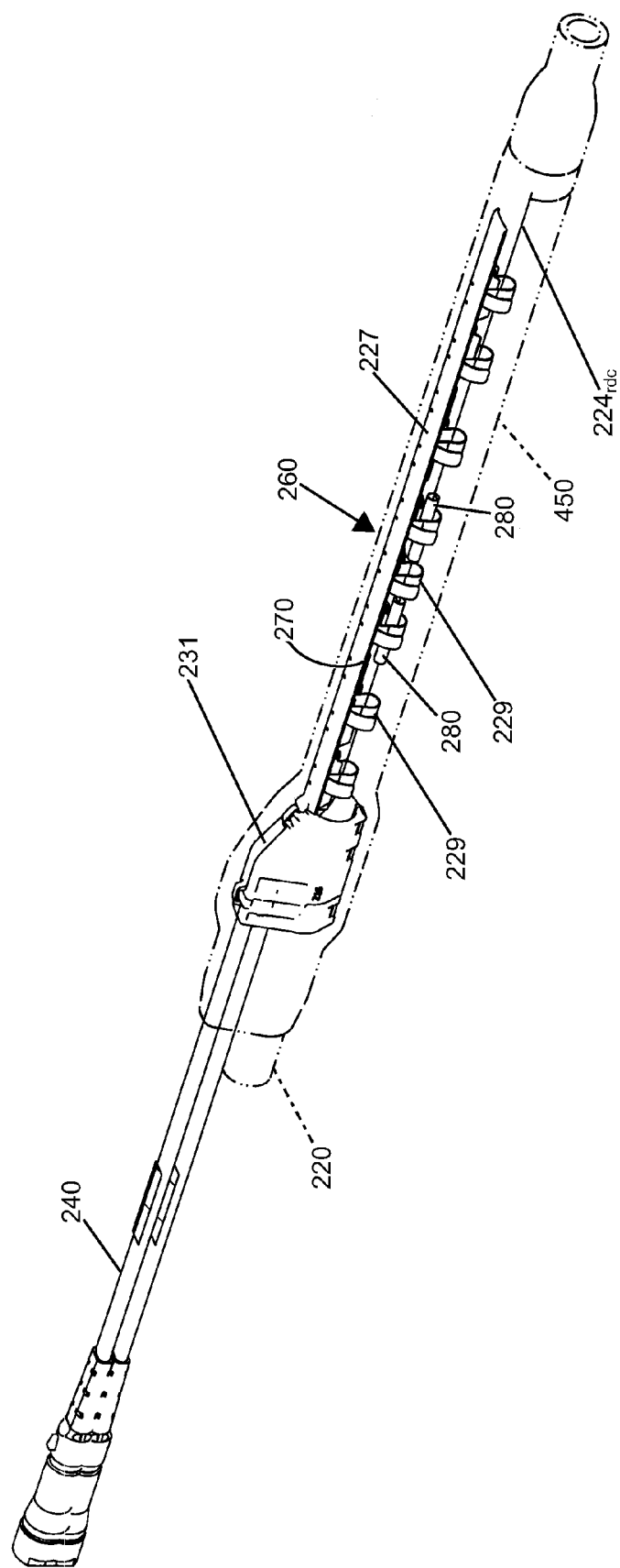
FIG. 6 is a perspective view of a break-out assembly installed on a distribution cable at a break-out location.

Referring now to FIG. 6, one or more tethers 240 can optically couple to the distribution cable 220. Each tether 240 branches outwardly from the distribution cable 220 at the break-out location 260. The break-out location 260 includes a coupling location 280 where selected ribbonized fibers $224_{rdc}$ (or separate fibers $224_{sdc}$) of the distribution cable 220 are optically coupled (e.g., spliced) to corresponding fibers of the tether 240. It is preferred for the fibers of the tether 240 to be pre-terminated to the fibers $224_{rdc}$ (or $224_{sdc}$) of the distribution cable 220. "Pre-terminated" means that the fibers are fused (e.g., spliced) or otherwise connected to the fibers $224_{rdc}$ (or $224_{sdc}$) of the distribution cable 220 at the factory as part of the cable manufacturing process rather than being field terminated. In other embodiments, a splice-less break-out may be used in which a fiber from the distribution cable 220 is accessed and routed into the tether without any intermediate splice.

In one example, the coupling location 280 is recessed within the outer jacket 230 of the distribution cable 220$_{rf}$ along with the ribbonized fibers 224$_{rdc}$ and an end portion of the tether buffer tube 242. In other words, the coupling location 280 is positioned inside an outer boundary or envelope defined by the outer shape (e.g., the outer diameter) of the outer jacket 230. Positioning the coupling location 280 within the outer jacket 230 of the distribution cable 220$_{rf}$ provides a smaller transverse cross-section of the break-out location 260.

Figure 5:
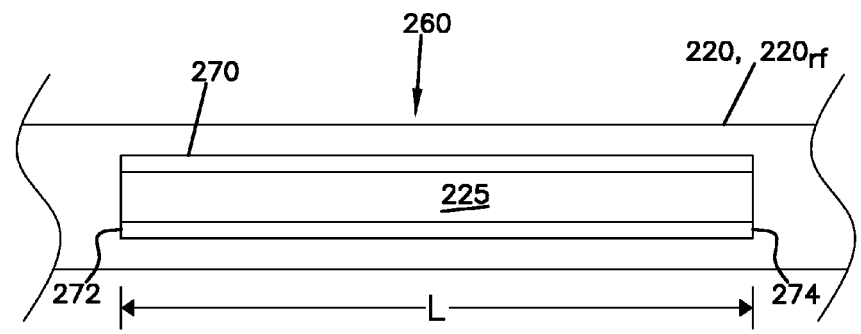
FIG. 5 is a top view of the distribution cable of FIG. 2 including the cut region of FIG. 4.

Referring now to FIGS. 2, 4, and 5, to prepare the break-out location 260 on the distribution cable 220, 220$_{rf}$, a portion of the cable 220, 220$_{rf}$ is first cut away to provide a cut region 270 (e.g., a rectangular access slot cut through the jacket 230 and optionally the buffer tube 222). The cut region 270 extends along a length L from a first end 272 to a second, opposite end 274. The ribbon stack 225 is accessible through the cut region 270. One or more of the ribbons of the ribbon stack 225 are then selected and the fibers 224$_{rdc}$ of the selected ribbons are accessed. With the distribution cable 220$_{rf}$ prepared as shown in FIG. 5, the fibers 224$_{rdc}$ are ready to be terminated to a prepared tether 240 as shown in FIG. 6.

In certain embodiments, it is desired to avoid having the strength members 226 (see FIG. 2) and/or the ripcords 232 (see FIGS. 2 and 3) within the cut region 270. It may also be desired to have the cut region 270 located over a certain area of the distribution cable 220. In these cases, exterior marks may be placed on the jacket 230 to guide and locate the orientation of the cut region 270 with respect to the distribution cable 220. Exterior marks may also be placed along the length of the distribution cable to guide and locate the position of the cut region 270 along the length of the distribution cable 220. The exterior marks may include numbers indicating a length or an angular measurement.

In the above-described break-out arrangement, a cut region or slot 270 was provided in the cable jacket 230 and buffer tube 222. Because the cable 220 has been compromised, flexing of the cable can cause distortion of the cable cross-section and/or movement of the strength member 226 within the cable 220. To protect the splice location, further reinforcement can be provided to resist cable distortion and/or strength member movement. For example, in the embodiment of FIG. 6, a reinforcing strip 227 and reinforcing clips 229 are provided along the cut region 270. The embodiment of FIG. 6 also includes an anchor block 231 for anchoring two tethers 240 to the cable 220. Further details of the embodiment of FIG. 6 can be found at U.S. provisional patent application Ser. No. 60/976,054, entitled FACTORY SPLICED CABLE ASSEMBLY, filed Sep. 28, 2007, that is hereby incorporated by reference in its entirety. U.S. Pat. No. 7,840,109, entitled FACTORY SPLICED CABLE ASSEMBLY, issued Nov. 23, 2010, claims the benefit of U.S. provisional patent application Ser. No. 60/976,054.

An over-mold 450 completes a break-out assembly 200 as shown in FIG. 6. The over-mold 450 encloses and seals the cut region 270 of the distribution cable 220 and also covers the anchor block 231 and portions of the tether cables 240. In certain embodiments, a wrap of heat resistant tape (e.g., silicone tape) can provide an intermediate layer between certain portions of the distribution cable 220 and certain portions of the over-mold 450. The break-out assembly 200 including the over-mold 450 is preferably factory installed.

To facilitate the manufacture of the break-out assembly 200 described above, a cable access tool capable of cutting into such distribution cables with adequate precision and cutting power is disclosed below. In addition, a method of use is provided. Furthermore, the cable access tool and method of use produce repeatable results and are suitable for implementation in a manufacturing environment.

In particular, the cable access tool and method of use are beneficial in preparing the break-out location 260 along the fiber optic distribution cable 220 (see FIGS. 4 and 5). The cable access tool and method provide a means for accurately and efficiently cutting through the jacket 230 and the buffer tube 222 of the fiber optic cable 220 with a controlled cutting path at the break-out location 260. Furthermore, the cable access tool and method will not damage (or cause damage to) the optical fibers 224$_{rdc}$ or 224$_{sdc}$ located within the fiber optic cable 220 when properly implemented. The break-out location 260 may be further prepared and fitted with the branch (tether) fiber optic cable 240 and hardware as mentioned above to form a break-out assembly 200.

The cable access tool provides a means to securely hold the fiber optic distribution cable 220 and to cut through the jacket 230 and the buffer tube 222 of the fiber optic cable 220 resulting in one or more cuts 290 into the cable 220. A means of accurately controlling a length, L, and a depth of the cut(s) 290 is provided. In addition, a means of accurately positioning the cut(s) 290 both in relation to the fiber optic cable 220 and in relation to other cuts 290 is provided.

Figure 15:
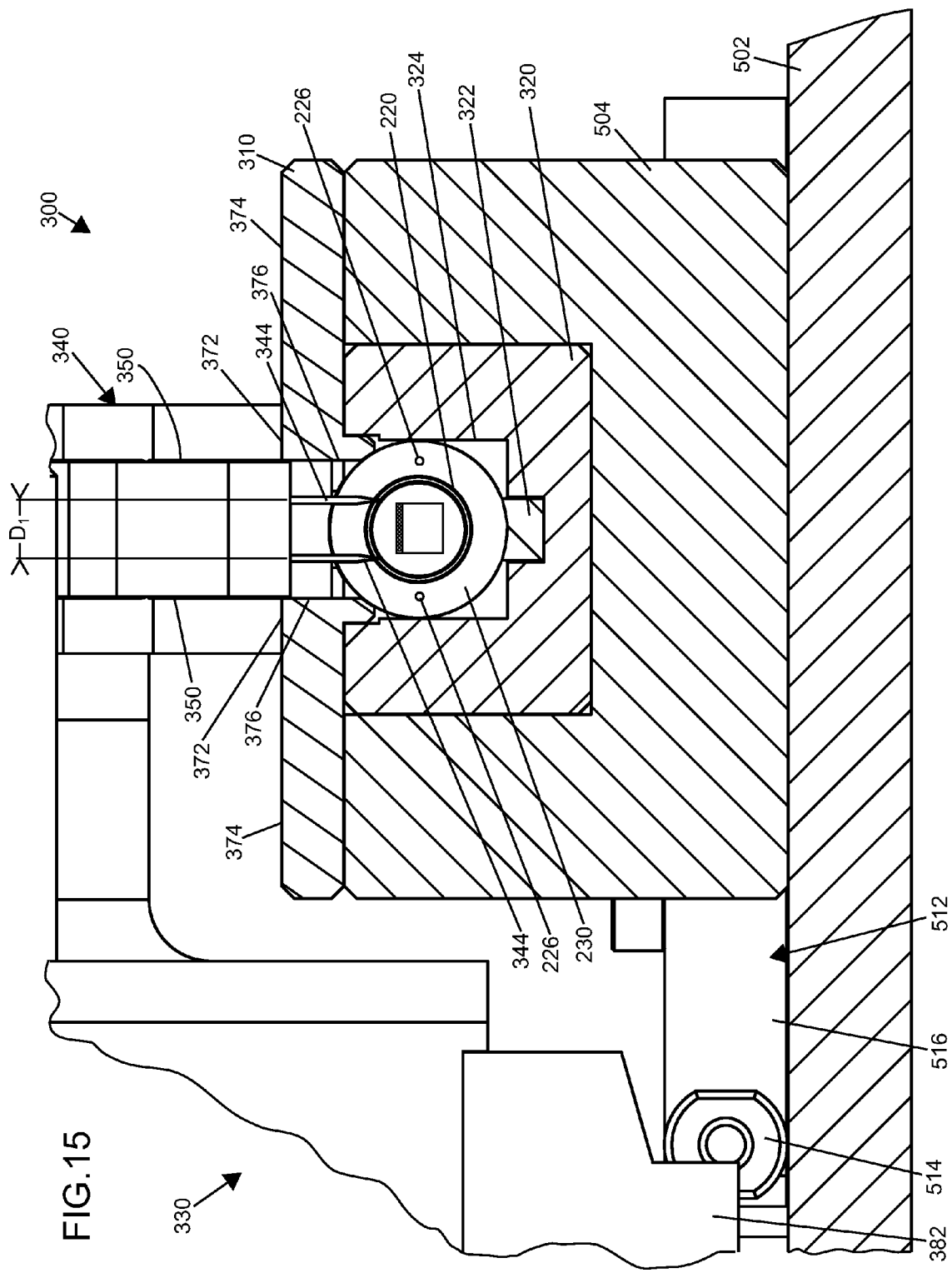
FIG. 15 is an enlarged cross-sectional front elevation view of the cable access tool of FIGS. 7 and 9 with the cutting handle assembly pivoted into the cutting position of FIG. 13.
Figure 16:
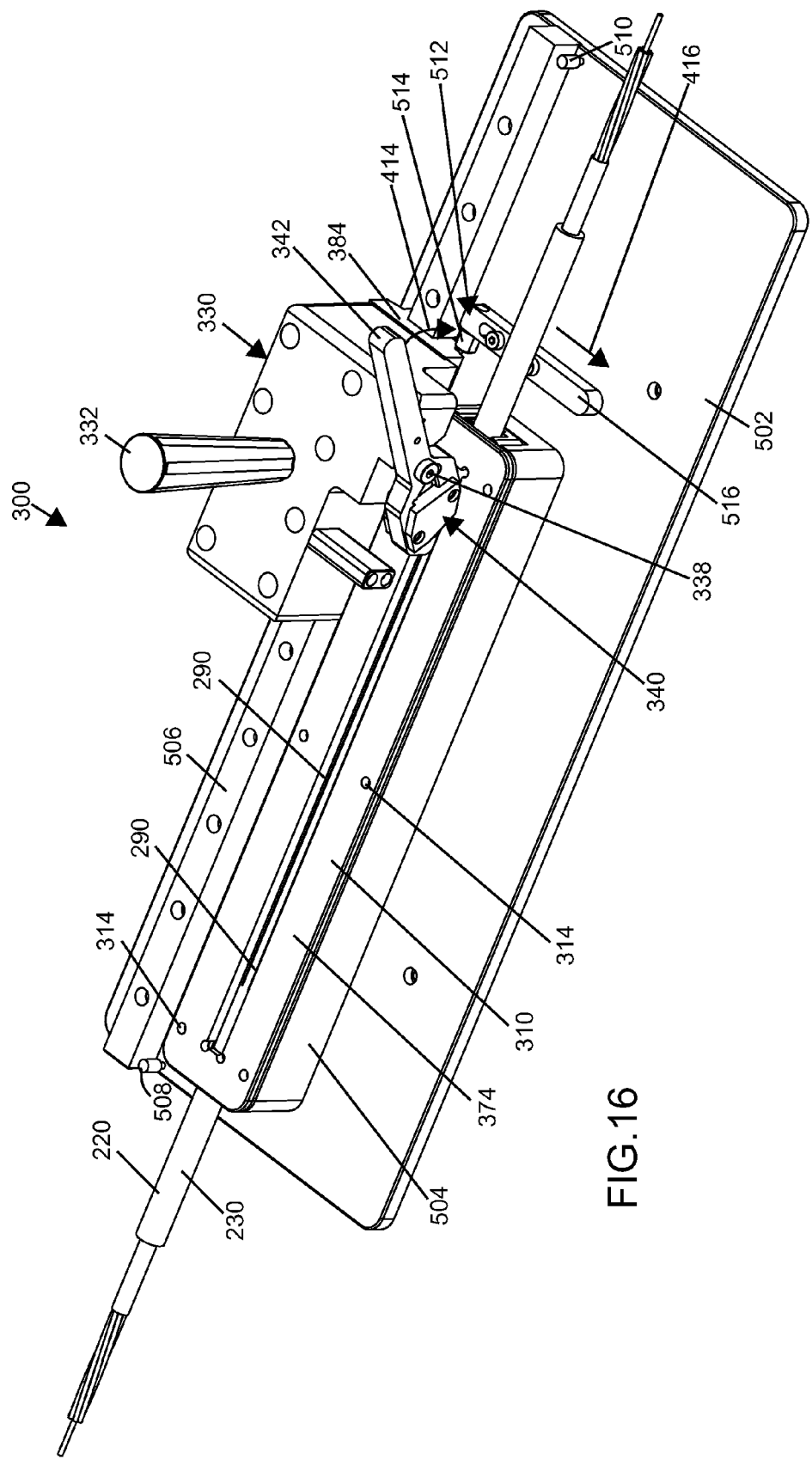
FIG. 16 is a perspective view of the cable access tool and the distribution cable of FIG. 9 with the cutting head assembly moved rearward to the moveable rear stop, thereby cutting two boundaries of a cut region on a jacket of the distribution cable.
Figure 17:
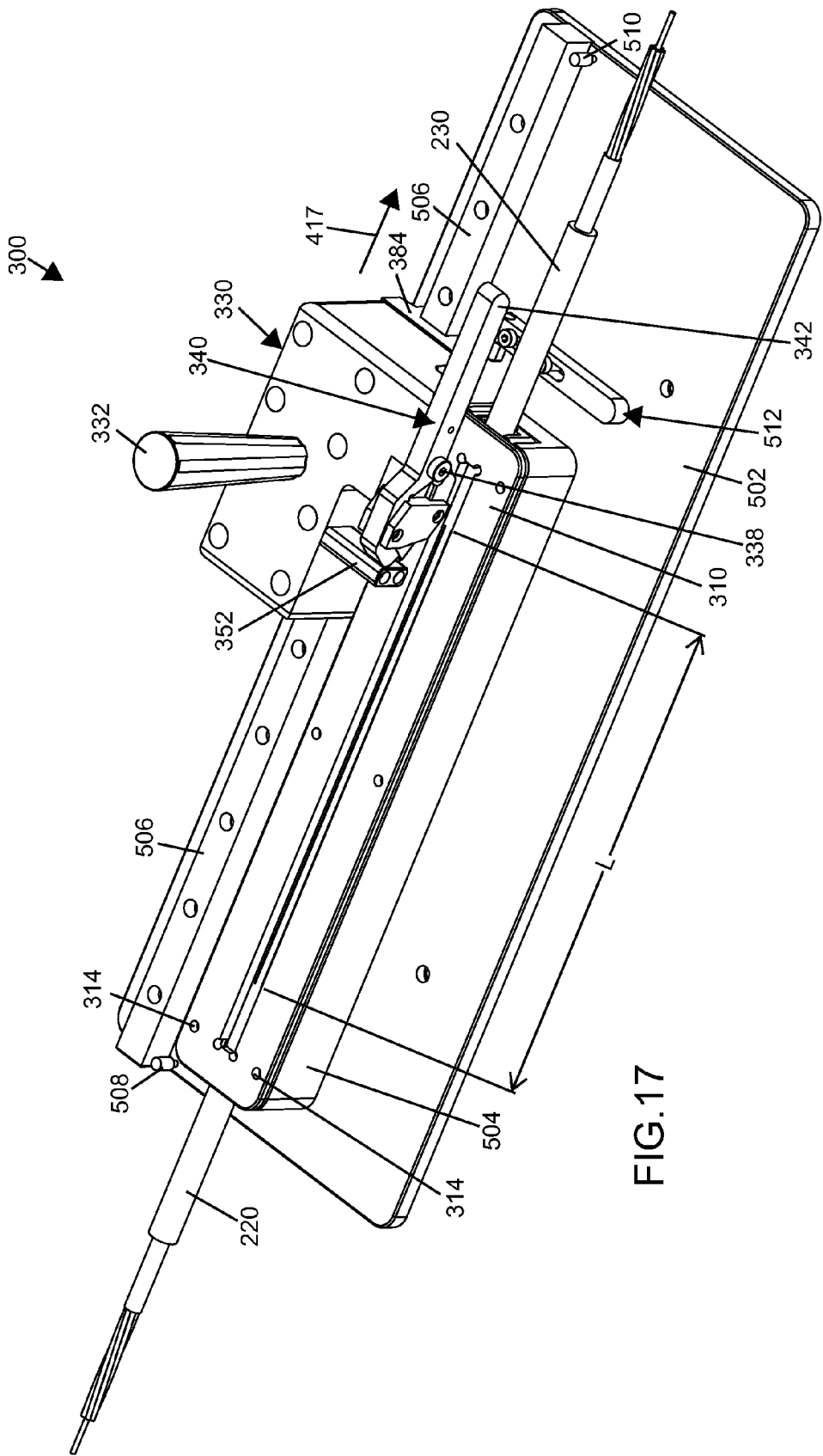
FIG. 17 is a perspective view of the cable access tool of FIG. 9 and the cut distribution cable of FIG. 16 with the cutting handle assembly pivoted into a non-cutting clearance position and the moveable rear stop moved into a non-engaging position.
Figure 18:
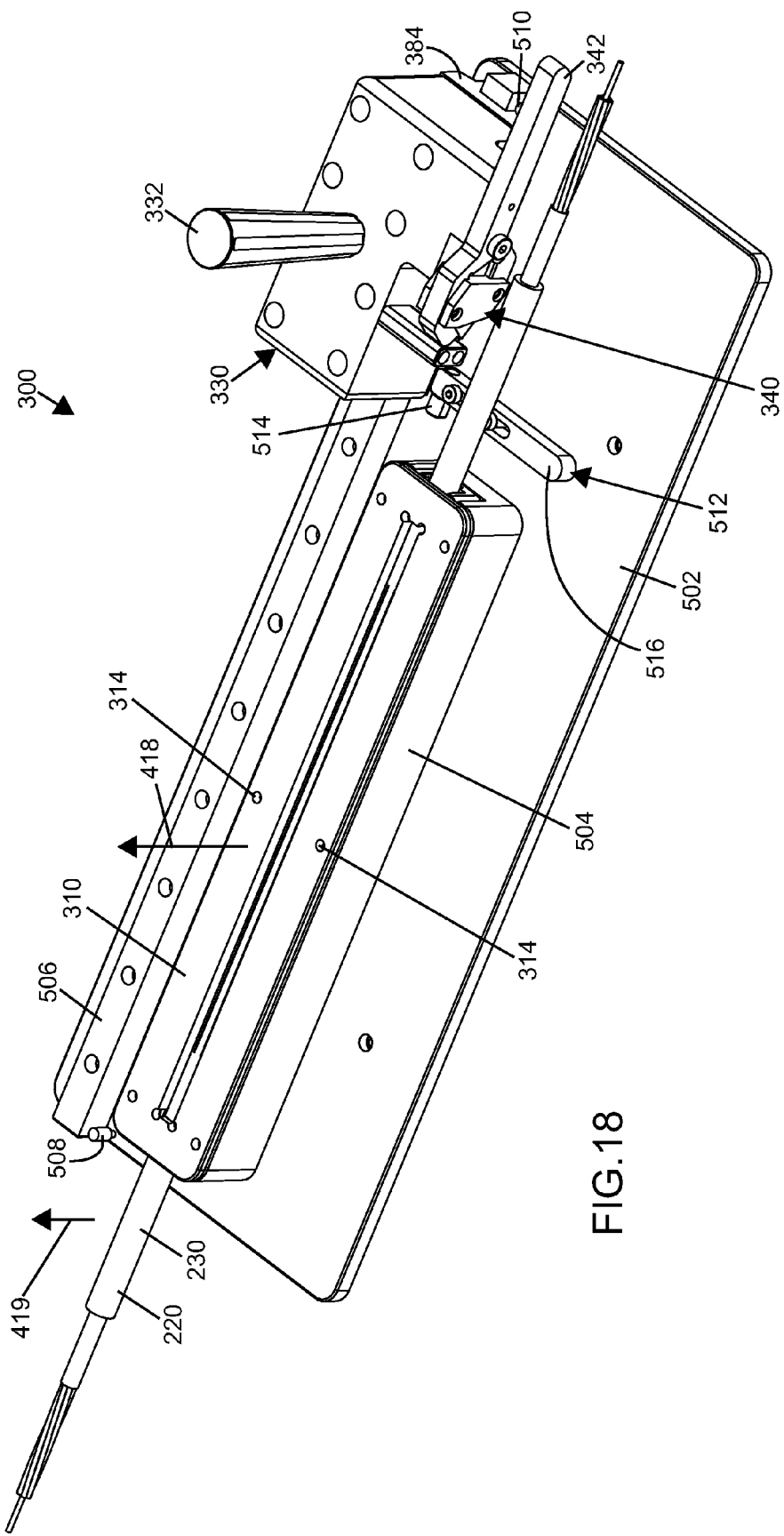
FIG. 18 is a perspective view of the cable access tool of FIG. 9 and the cut distribution cable of FIG. 16 with the cutting head assembly moved rearward to a fixed rear stop.
Figure 19:
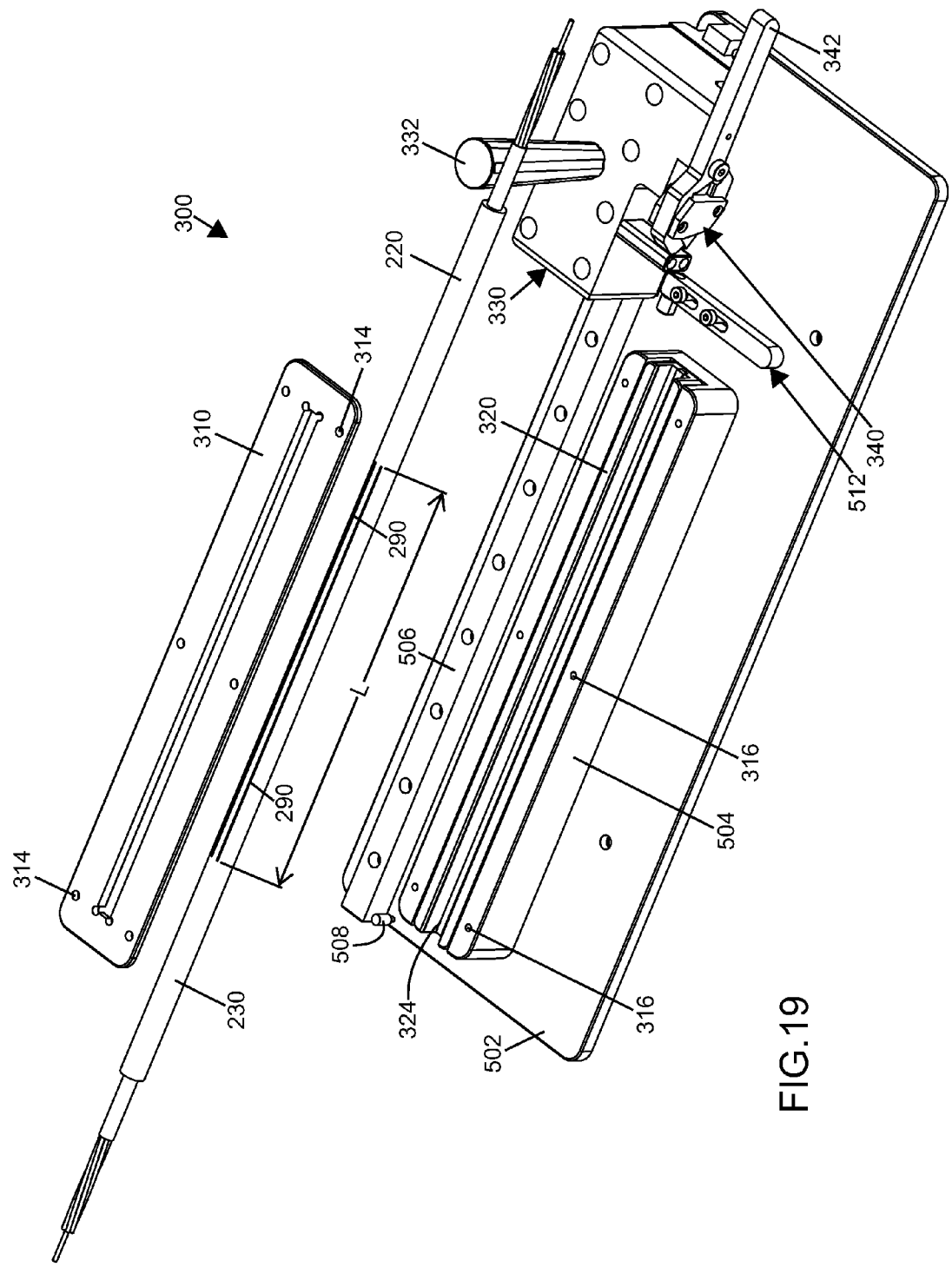
FIG. 19 is a perspective view of the cable access tool of FIG. 9 and the cut distribution cable of FIG. 16 with the cable holder cap and the cut distribution cable uninstalled.

Turning now to the figures and in particular to FIGS. 7 through 19 and 28 through 30 there are shown example embodiments of the cable access tool 300, 300'. The cable access tool 300 includes a base or a base plate 502 with mounting features to fixedly mount a cable holder 504. The cable holder 504 includes mounting features which fixedly mount it to the base. Alternatively, a base 502' may be integrated with a cable holder 504'. The cable holder 504 optionally includes a cable holder insert 320. The cable holder 504' or, optionally, the cable holder insert 320 includes a channel 324 sized to receive the fiber optic distribution cable 220 with a portion of the fiber optic cable 220 lying lengthwise within the channel 324. The channel 324 establishes a predetermined position for the fiber optic cable 220 with respect to the base 502, 502' allowing sliding along the channel 324 and rotating within the channel 324 but restricting other movements of the cable 220. In certain embodiments, a compression pad 322, made of a compressible material such as rubber, is mounted in the bottom of the channel 324 as shown in FIG. 15. Multiple cable holder inserts 320a, 320b, 320c may be provided, each with a different size channel 324a, 324b, 324c matching various fiber optic cable sizes 220a, 220b, 220c (see FIGS. 7 and 8). One of the multiple cable holder inserts 320a, 320b, 320c, which matches the size of the fiber optic cable 220a, 220b, 220c being prepared, is selected for use at a time. The cable holder 504, 504' includes mounting features 316 to removably mount a cable holder cap 310, 310'.

The cable holder cap 310, 310' includes mounting features 314 which removably mount it to the cable holder 504, 504'. The cable holder cap 310, 310' also includes cable locating features 312 to further hold and position the fiber optic cable 220. The cable locating features 312 may act as a clamp against the fiber optic cable 220 whereupon friction between the fiber optic cable 220 and both the cable holder channel 324 and the cable locating features 312 prevent the aforementioned sliding along and rotating within the cable holder channel 324. Multiple cable holder caps 310a, 310b, 310c may be provided, each with differently sized cable locating features 312a, 312b, 312c matching various fiber optic cable sizes 220*a*, 220*b*, 220*c* (see FIGS. 7 and 8). One of the multiple cable holder caps 310*a*, 310*b*, 310*c*, which matches the size of the fiber optic cable 220*a*, 220*b*, 220*c* being prepared, is selected for use at a time. The cable holder cap 310, 310' further includes a cutting blade access slot 376 with a first end 375 and a second end 377 to allow one or more cutting blades 344 including a cutting edge 346 to pass through it (see FIGS. 9 and 28).

Figure 26:
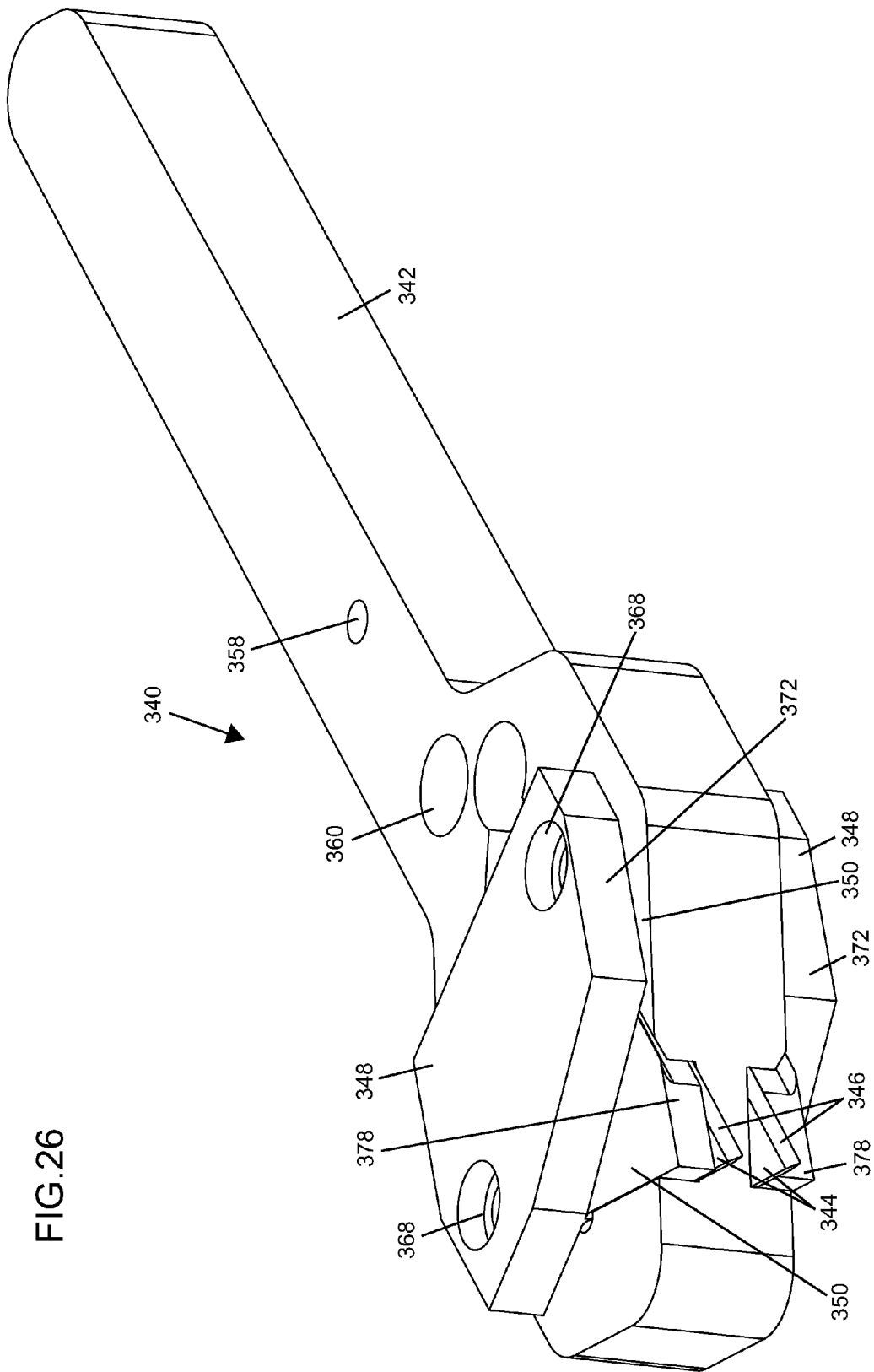
FIG. 26 is an enlarged perspective view of the cutting handle assembly of FIG. 13.
Figure 27:
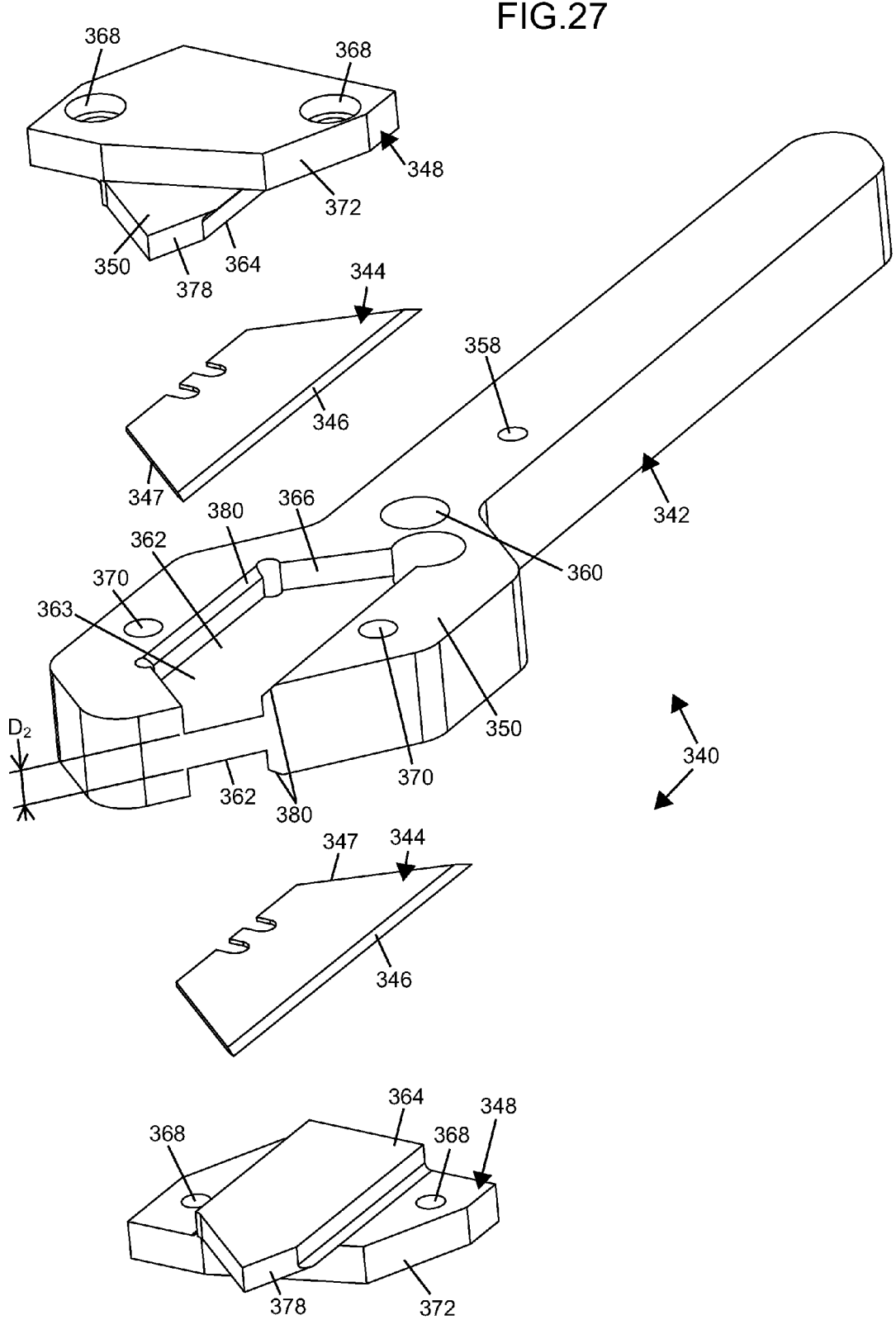
FIG. 27 is an exploded, enlarged perspective view of the cutting handle assembly of FIG. 13.

The cutting blade(s) 344 are held by and are included in a cutting handle assembly 340, 340' (see FIGS. 26, 27, 29, and 30). The cutting handle assembly 340, 340' includes a handle 342, 342' with mounts for securing the cutting blade(s) 344. In a preferred embodiment, the mounts each include a pocket 362 with a bottom 363 into which a portion of the cutting blade 344 is seated. A portion 364 of a cutting blade retainer 348, 348' may be seated over each cutting blade 344 and within each pocket 362 thus sandwiching the cutting blade 344 between the cutting blade retainer portion 364 and the pocket bottom 363. The pocket(s) 362 may include a perimeter 366 with portions sized to locate a portion of a perimeter 347 of the cutting blade 344. The pocket(s) may include one or more chamfers 380. The cutting handle 342 may have attachment features 370 to secure the cutting blade retainer(s) 348 which may have matching attachment features 368 as shown in FIG. 27. For embodiments with two cutting blades 344, it is preferred to have two pockets located a distance $D_2$ apart that hold the cutting blades 344 a distance $D_1$ apart (see FIGS. 15 and 27). In certain embodiments, the cutting handle assembly 340' is held by hand and brought into contact with guiding features (see FIGS. 28 through 30) further described below. In other embodiments, the cutting handle assembly 340 is held by a cutting head assembly 330 and moved by hand within the constraints imparted by the cutting head assembly 330 (see FIGS. 7 through 19) further described below.

In certain embodiments, one or more cut depth limiting features 372, 372', are provided on the handle 342' (see FIGS. 27 through 30), a cutting blade (not shown), and/or the cutting blade retainer 348 (see FIGS. 26 and 27). The cut depth limiting features 372, 372' limit penetration of the cutting blade 344 into the fiber optic cable jacket 230, optionally including the buffer tube 222 (see FIGS. 29 and 30). In certain embodiments, the cut depth limiting features 372, 372' ride on an elevation control surface 374, 374' of the cable holder cap 310, 310' thus limiting penetration of the cutting blade 344 into the fiber optic cable jacket 230, optionally including the buffer tube 222 (see FIGS. 13 through 15 and 28 through 30). In still other embodiments, certain cut depth limiting features are incorporated into the cutting head assembly 330 and are further described below. Two or more embodiments of this paragraph may be combined within the same cable access tool.

In certain embodiments, cable stabilizing features 378, 378' ride on the fiber optic cable 220 while cutting progresses (see FIGS. 29 and 30). The cable stabilizing features 378, 378' hold portions of the cable down and in a desired position near the cutting blade 344.

In certain embodiments, one or more cut guide features 350 are provided on the handle 342, 342', the cutting blade, and/or the cutting blade retainer 348 (see FIGS. 13 through 15 and 26 through 28). In certain embodiments, the cut guide features 350 are integrated with the cable stabilizing features 378, 378' as shown in FIGS. 27, 28, and 30. In certain embodiments, the cut guide features 350 slide within the cutting blade access slot 376 of the cable holder cap 310, 310' while cutting progresses thus controlling the lateral position and orientation of the cutting blade 344 with respect to the fiber optic cable jacket 230. In certain embodiments, cut guide features are incorporated into the cutting head assembly and a slide rail further described below. The embodiments of this paragraph may be combined within the same cable access tool.

In certain embodiments, one or more cut length limiting features 382', 384' are provided on the handle 342', the cutting blade, and/or a cutting blade retainer. In certain embodiments, the cut length limiting features 382', 384' engage the first 375 and/or second 377 ends of the cutting blade access slot 376 limiting the length of the cut along the fiber optic cable jacket 230 (see FIGS. 28 and 30). In certain embodiments, certain cut length limiting features 382, 384 are incorporated into the cutting head assembly further described below. The embodiments of this paragraph may be combined within the same cable access tool.

In certain embodiments, one or more cutting blade stabilizing features 386, 388 are provided on the handle 342', a cutting blade, and/or a cutting blade retainer. In certain embodiments, the cutting blade stabilizing features 386, 388 engage the fiber optic cable jacket 230 and may be combined with the cable stabilizing features 378' (see FIGS. 29 and 30). In certain embodiments, cutting blade stabilizing features engage the elevation control surface 374' of the cable holder cap 310'. In the embodiments of this paragraph, the cutting blade stabilizing features control the orientation of the cutting blade relative to the fiber optic cable jacket 230. The embodiments of this paragraph may be combined within the same cable access tool.

Figure 24:
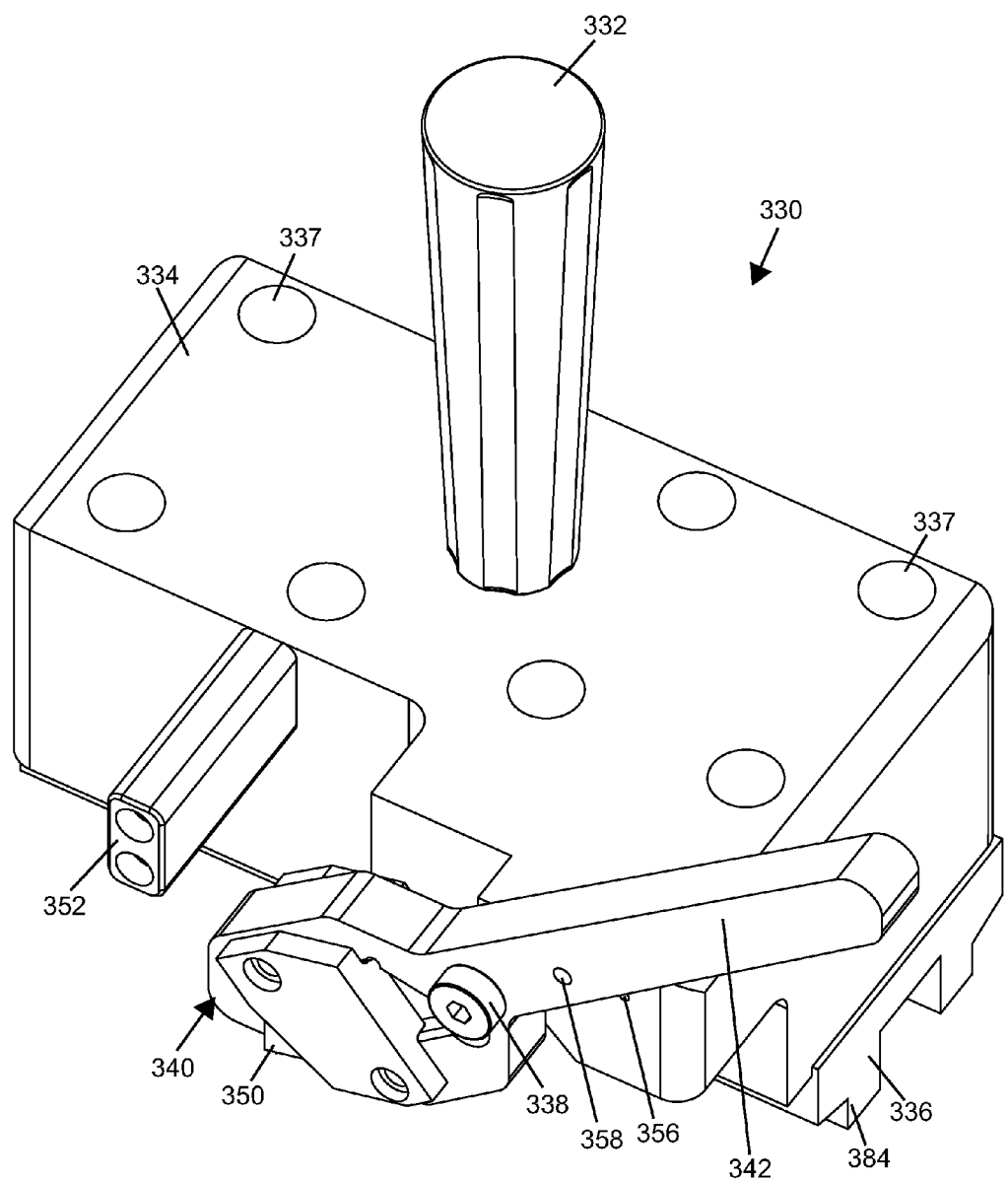
FIG. 24 is an enlarged perspective view of the cutting head assembly of FIG. 12.
Figure 25:
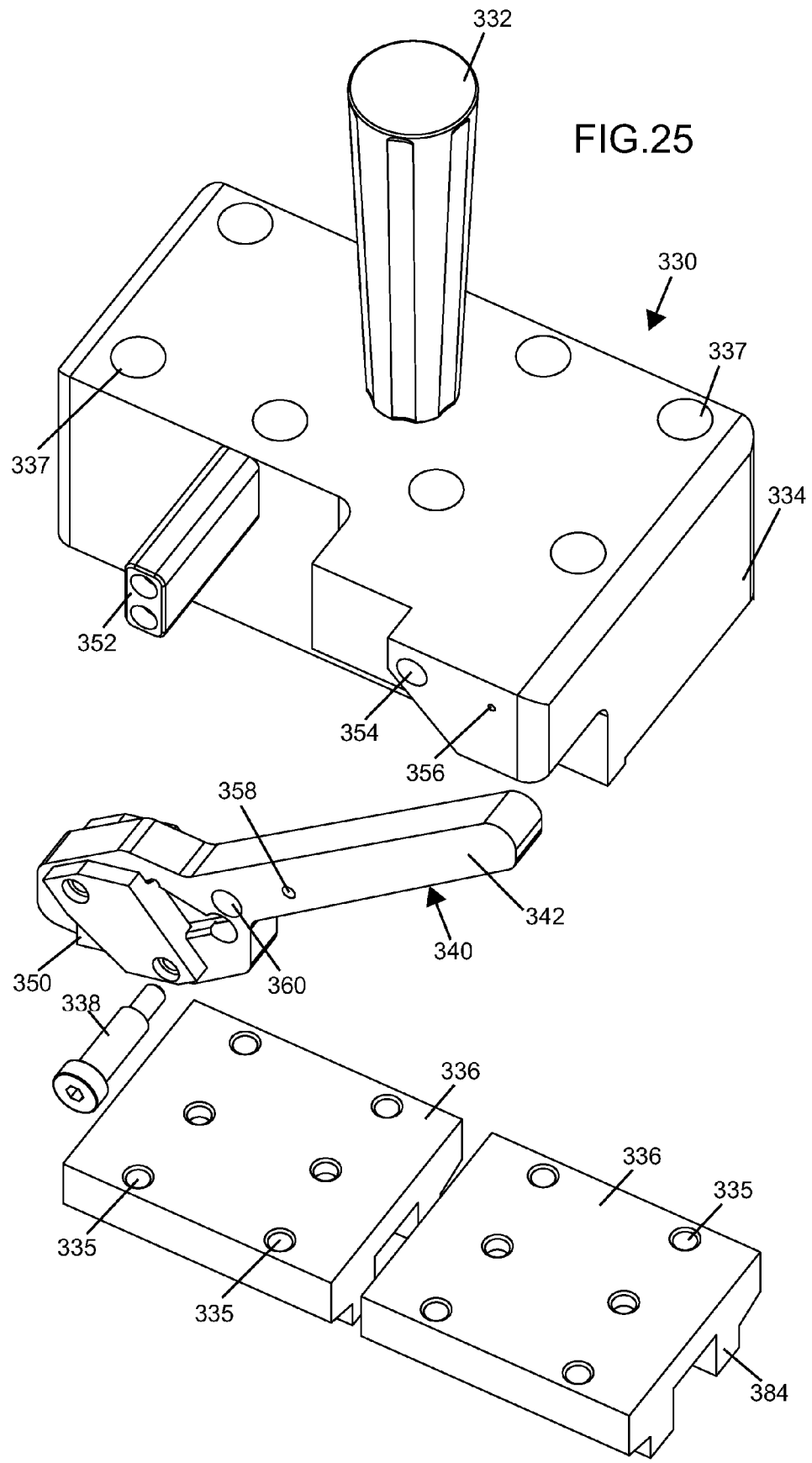
FIG. 25 is an exploded, enlarged perspective view of the cutting head assembly of FIG. 12.

The optional cutting head assembly 330, mentioned above, is included in certain embodiments and includes a cutting head body 334. The cutting head body 334 may include a pivot mount 354 for mounting a pivot 338 whereupon a pivot bearing 360 of the cutting handle assembly 340 is rotatably mounted. FIGS. 24 and 25 show an example cutting head assembly 330 along with the cutting handle assembly 340. The cutting head body 334 may further include attachment features 337 for attaching one or more linear slides 336. The linear slide 336 may include attachment features 335 used in conjunction with the attachment features 337 of the cutting head body 334. The cutting head assembly 330 includes the linear slide(s) 336 that are slidably mounted on a linear slide rail 506 which is fixedly mounted on the base 502. A cutting head handle 332 may be attached to the cutting head assembly 330.

Rotational guidance about the pivot 338 of the cutting head assembly 330 is provided to the cutting handle assembly 340 and serves as a means to place the cutting blade(s) in either a cutting position or a non-cutting, clearance position. For example, FIGS. 7 through 12 and 17 through 19 show the cutting handle assembly 340 positioned about the pivot 338 in the non-cutting, clearance position. Conversely, FIGS. 13 through 16 show the cutting handle assembly 340 positioned about the pivot 338 in the cutting position. Stops and detents may be used in conjunction with the pivot 338 to provide an accurate and repeatable cutting position as well as establishing the non-cutting clearance position. For example, a pivot stop 352 may be used to limit the rotation of the cutting handle assembly 340 about the pivot 338 (see FIGS. 24 and 25). The pivot stop 352 may serve other functions such as a cutting blade guard. One or more detents 358 and detent pockets 356 may be used to keep the cutting handle assembly 340 in certain positions including the prescribed non-cutting clearance position. Rotational movement of the cutting handle assembly 340 may be limited by the cut depth limiting features 372 mounted thereon. For example, the cut depth limiting feature 372 may rest upon the elevation control surface 374 at the proper cutting blade 344 depth in addition to limiting rotational movement of the cutting handle assembly.

Linear movement restrictions along the linear slide rail 506 are provided to the cutting head assembly 330 and serve as a means to ensure proper cut 290 placement along the length of the fiber optic cable jacket 230. A fixed forward stop 508 engages the cut length limiting feature 382 to locate the beginning of the cut(s) 290. Likewise, a moveable rear stop 512, including a slide 516, engages the cut length limiting feature 384 to locate the end of the cut(s) 290. A fixed rear stop 510 is optionally provided to locate the cutting head assembly 330 when loading and unloading the cable 220 in the cable access tool 300. In a preferred embodiment, the stops 510, 512, 514 are mounted on the base 502.

Figure 7:
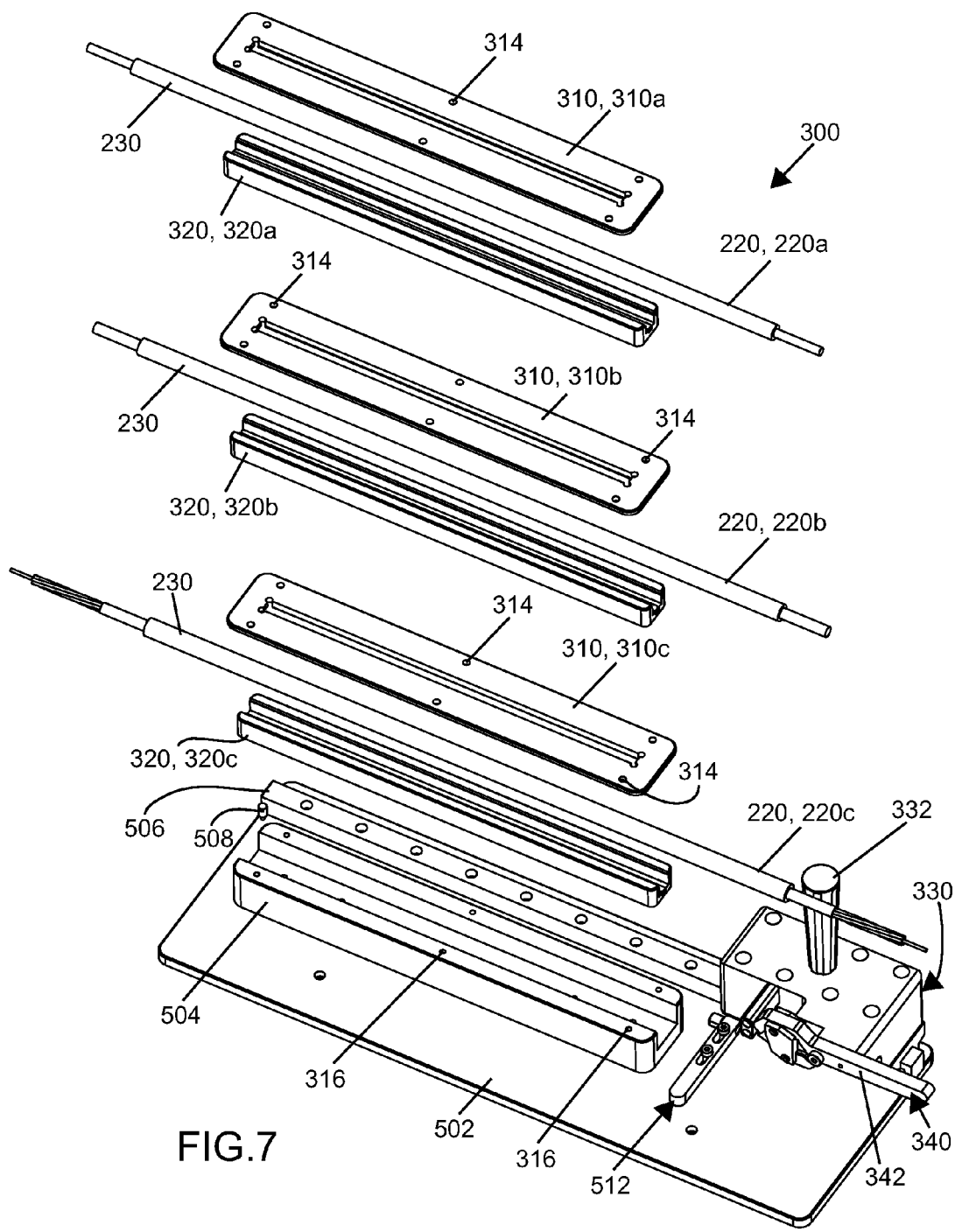
FIG. 7 is an exploded perspective view of a cable access tool adapted for use with distribution cables (also shown) of different sizes (three sizes illustrated)
Figure 8:
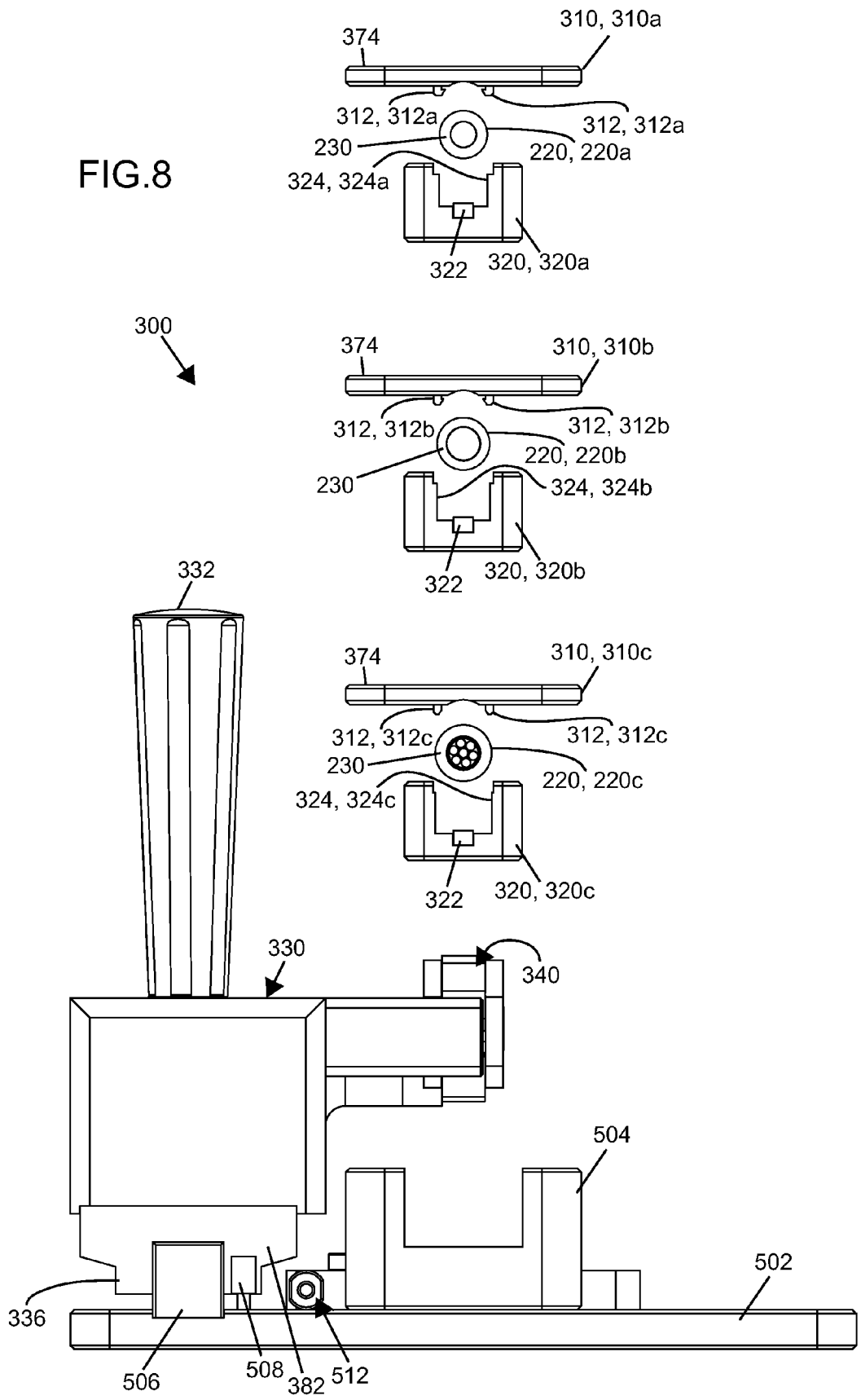
FIG. 8 is an exploded front elevation view of the cable access tool and the distribution cables of FIG. 7.

A preferred method of using the example cable access tool 300 including the cutting head assembly 330 and the cutting handle assembly 340 with twin cutting blades 344 includes the following steps which complete a cycle:

1. Upon determining the size of the fiber optic distribution cable 220, select the appropriate cable holder insert 320 and cable holder cap 310 as illustrated in FIGS. 7 and 8.

2. Initialize the position of the moveable rear stop 512, if necessary, by sliding it into the non-engaging position as illustrated by movement 416 in FIG. 16 and resulting in the placement of FIG. 17.

3. Initialize the position of the cutting handle assembly 340, if necessary, by rotating the cutting handle assembly 340 about the pivot 338 until the detent 358 engages the detent pocket 356 (see FIG. 24) as illustrated by movement 414 in FIG. 16 and resulting in the placement of FIG. 17.

4. Initialize the position of the cutting head assembly 330, if necessary, by sliding the cutting head assembly 330 rearward along the slide rail 506 until the cut length limiting feature 384 engages the fixed rear stop 510 as illustrated by movement 417 in FIG. 17 and resulting in the placement of FIG. 18.

5. Remove the cable holder cap 310 from the cable holder 504, if necessary.

6. Remove the cable holder insert 320 from the cable holder 504, if necessary.

Figure 9:
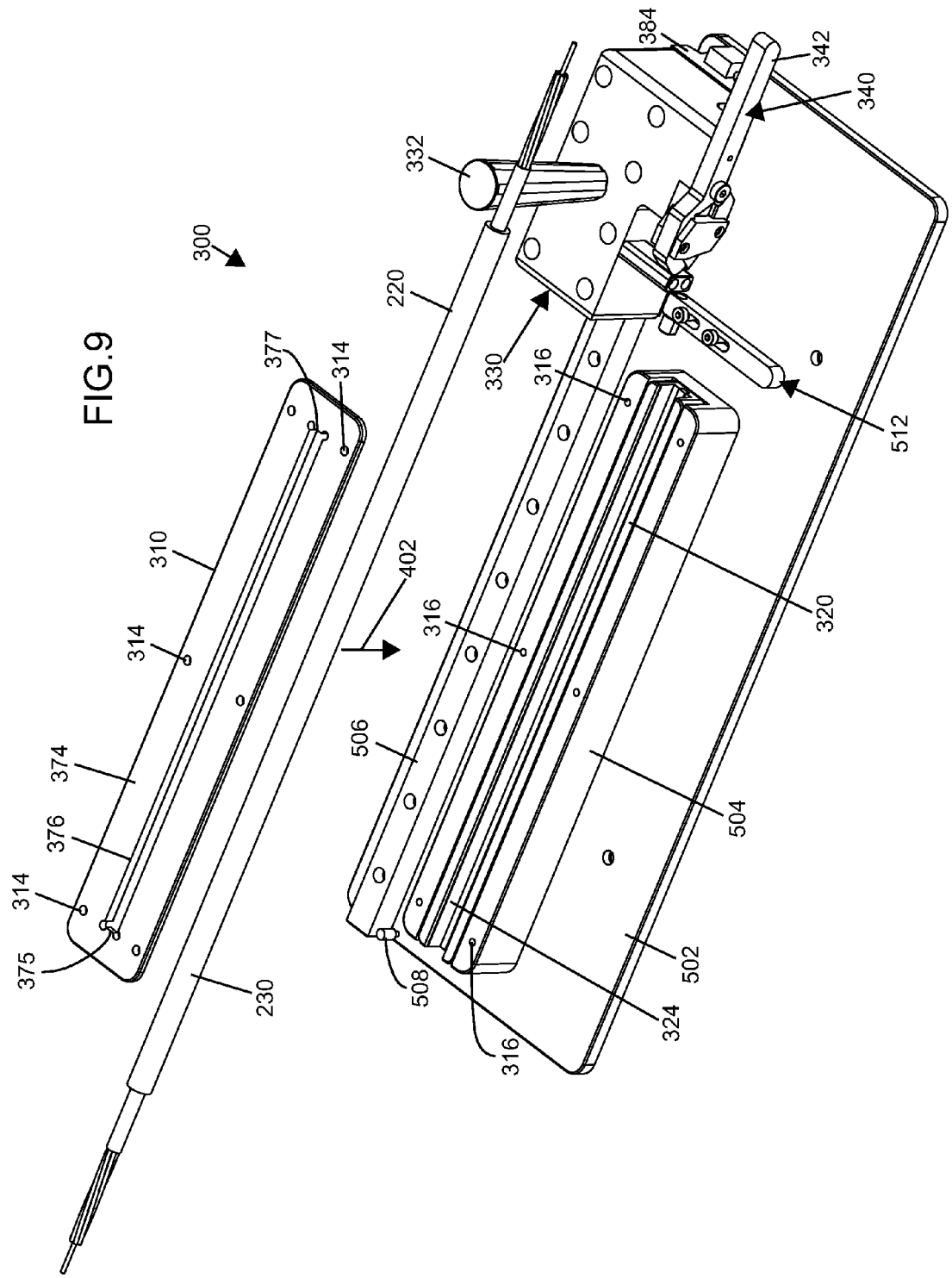
FIG. 9 is a perspective view of the cable access tool and one of the distribution cables of FIG. 7 with a cable holder insert selected and installed and a matching cable holder cap selected.
Figure 10:
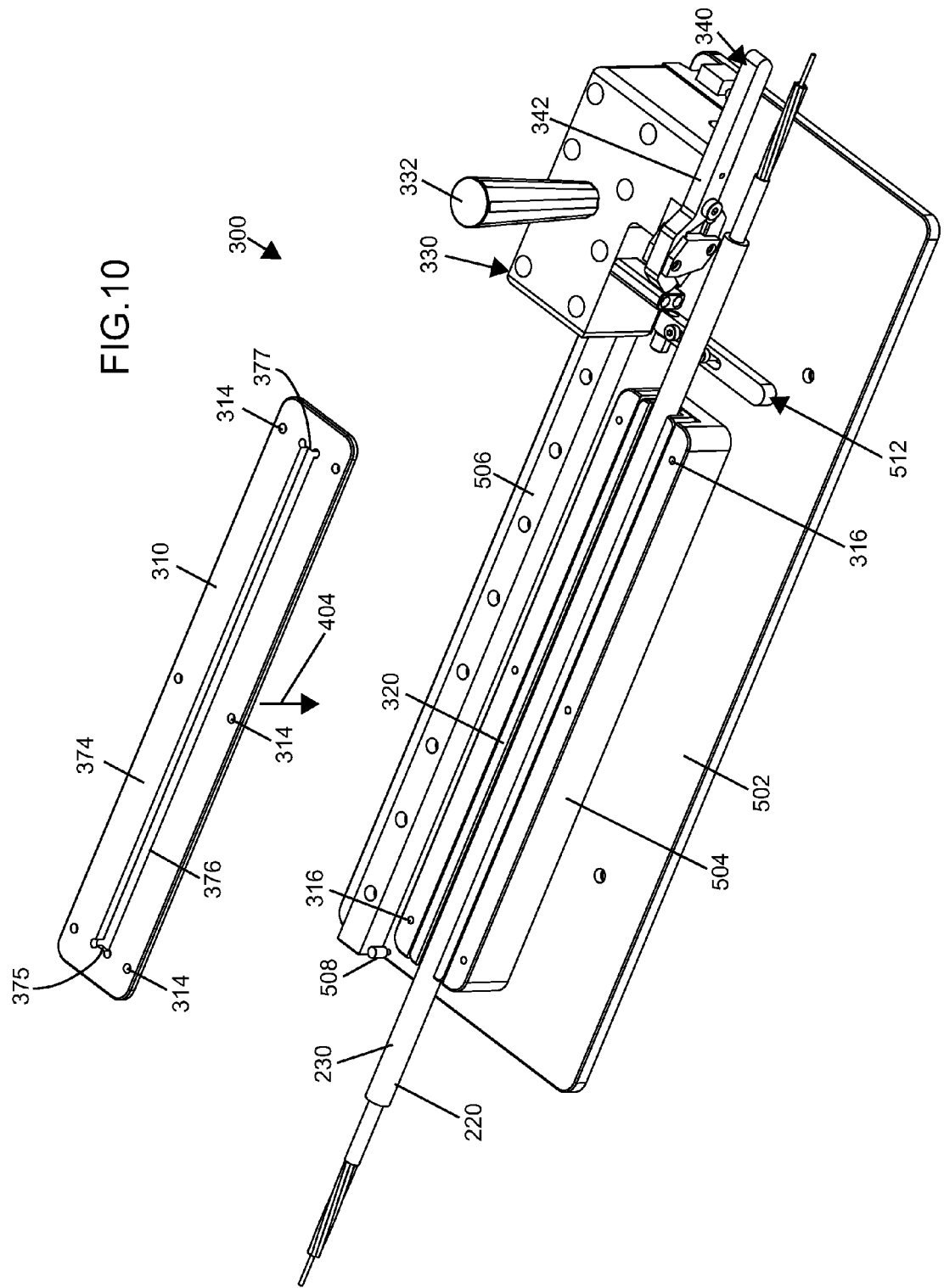
FIG. 10 is a perspective view of the cable access tool and the distribution cable of FIG. 9 with the distribution cable installed.
Figure 11:
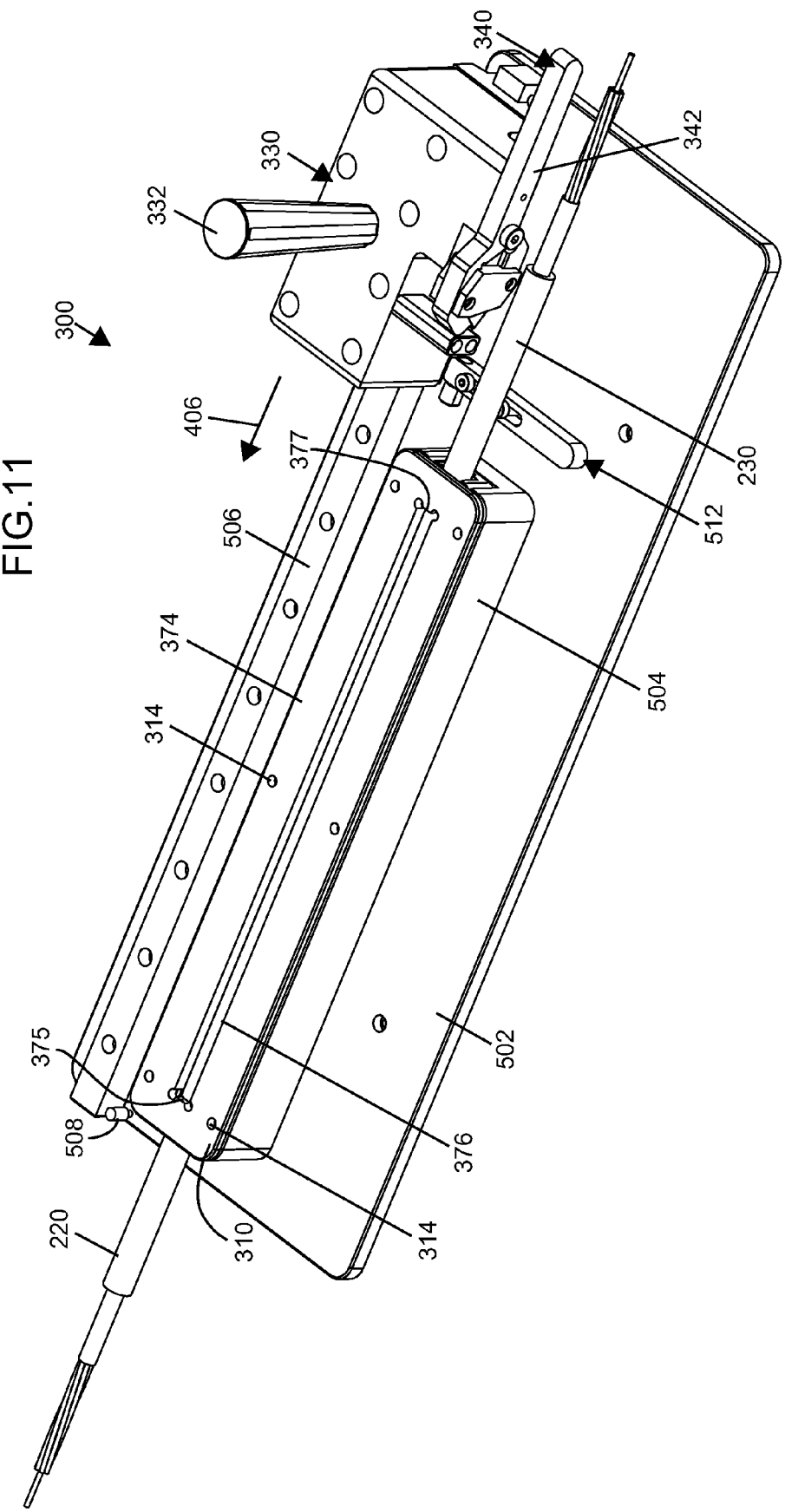
FIG. 11 is a perspective view of the cable access tool and the distribution cable of FIG. 9 with the cable holder cap of FIG. 9 installed.
Figure 12:
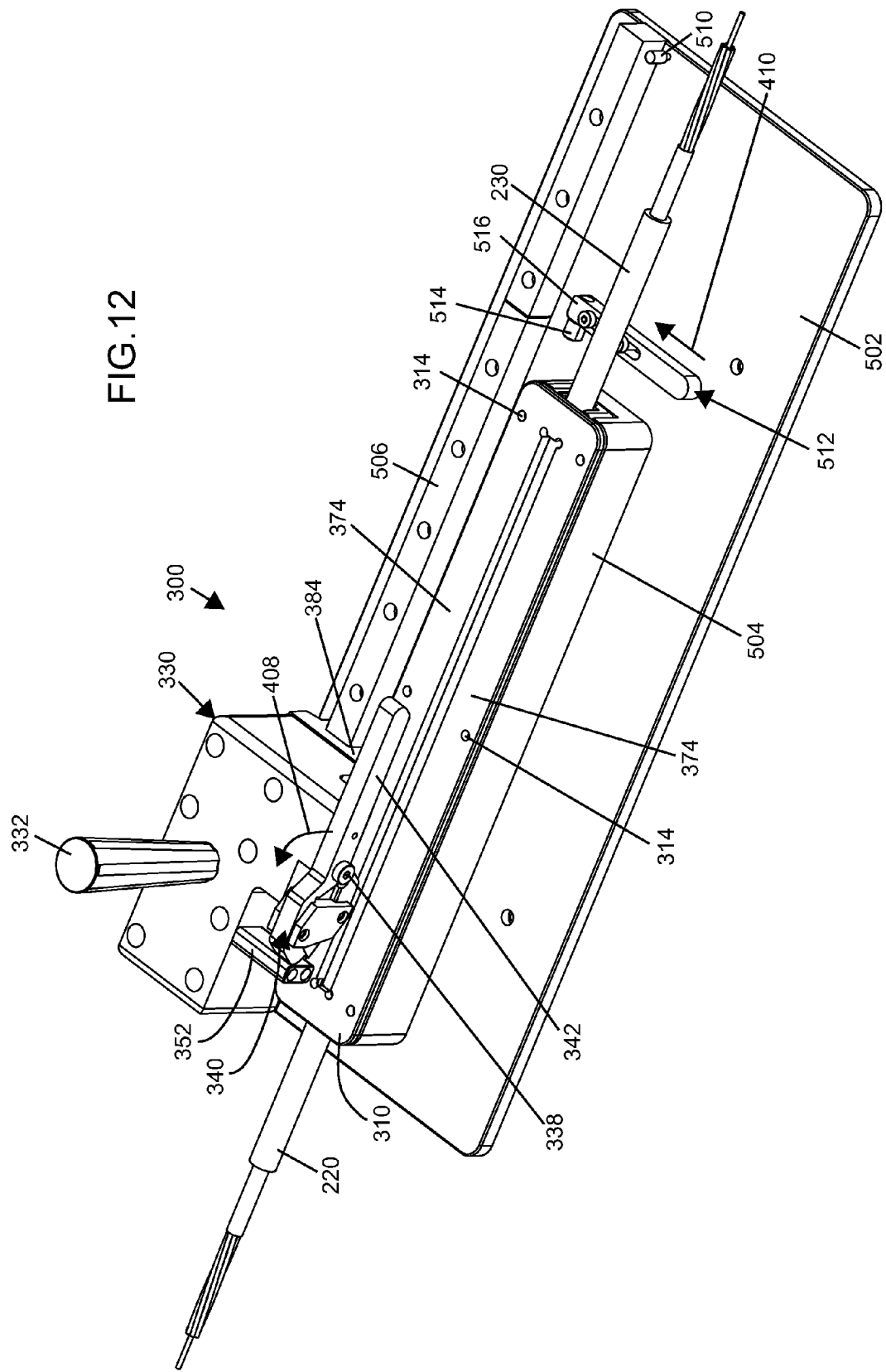
FIG. 12 is a perspective view of the cable access tool and the distribution cable of FIG. 9 with a cutting head assembly moved forward to a fixed forward stop.
Figure 13:
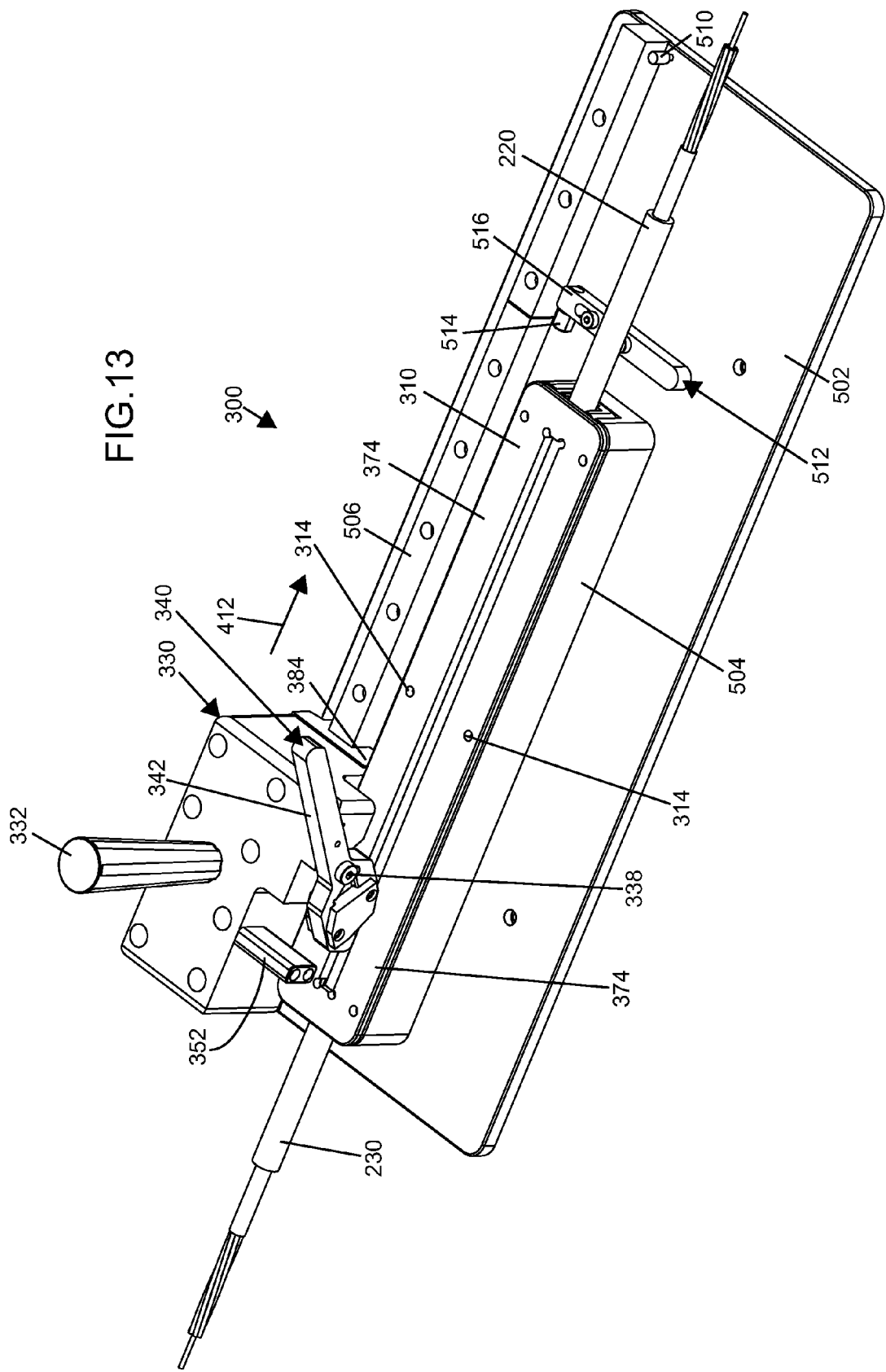
FIG. 13 is a perspective view of the cable access tool and the distribution cable of FIG. 9 with a cutting handle assembly pivoted into cutting position and a moveable rear stop moved into an engaging position.
Figure 14:
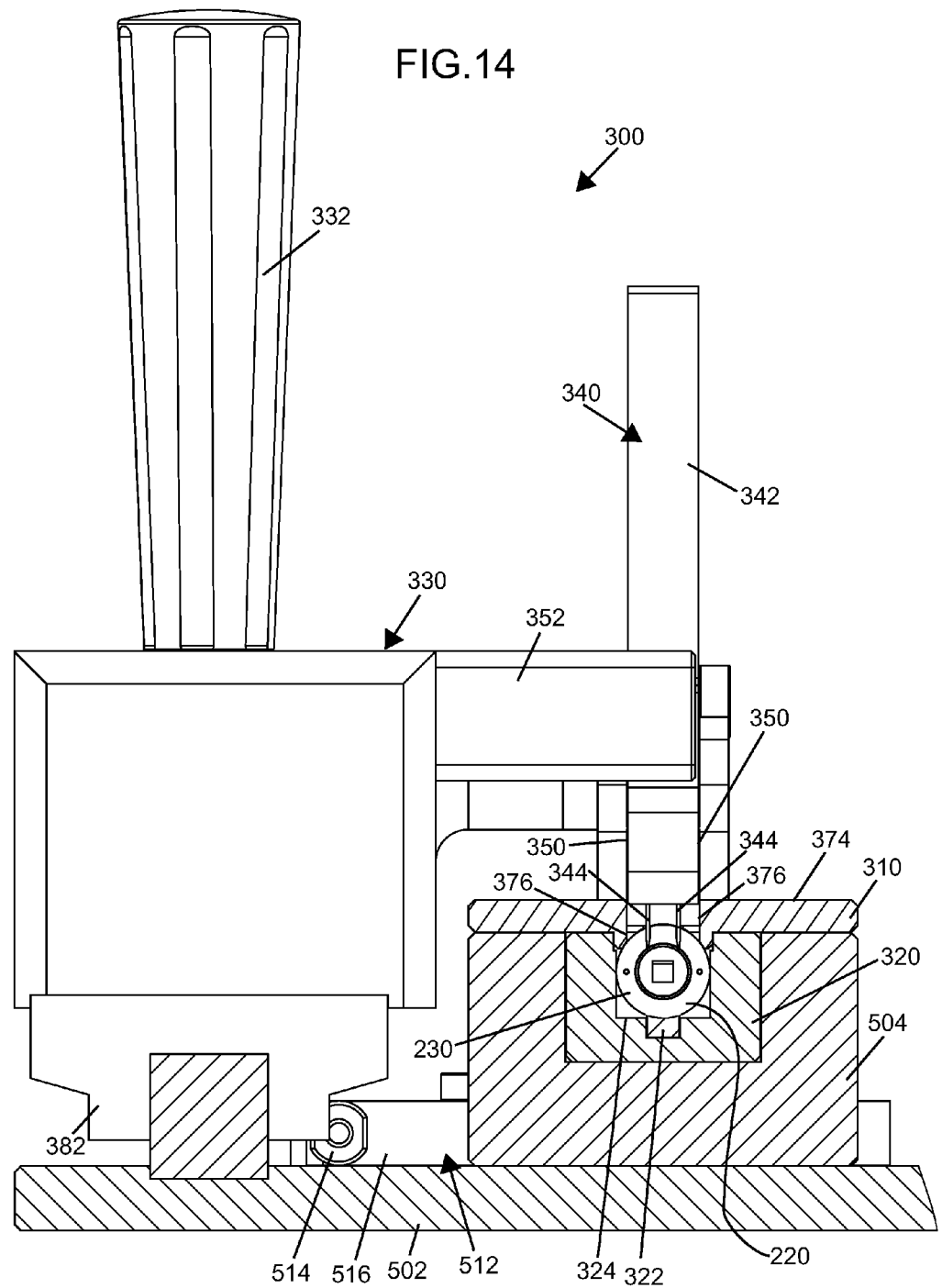
FIG. 14 is a cross-sectional front elevation view of the cable access tool of FIGS. 7 and 9 with the cutting handle assembly pivoted into the cutting position of FIG. 13.

7. Seat the selected cable holder insert 320 into the cable holder 504 as illustrated in FIG. 9.

8. Place the fiber optic distribution cable 220 within the cable holder channel 324 of the cable holder insert 320 as illustrated by movement 402 in FIG. 9 and resulting in the placement of FIG. 10.

9. Orient the distribution cable 220 such that the strength members 226 as shown in FIG. 2 and/or the ripcords 232 as shown in FIG. 3 will not intersect the cutting path of the cutting blades 344 nor lie between the cutting blades 344 (see FIGS. 14 and 15).

10. Place and secure the cable holder cap 310 on the cable holder 504 as illustrated by movement 404 in FIG. 10 and resulting in the placement of FIG. 11.

11. Slide the cutting head assembly 330 forward along the slide rail 506 until the cut length limiting feature 382 (see FIG. 8) engages the fixed forward stop 508 as illustrated by movement 406 in FIG. 11 and resulting in the placement of FIG. 12.

12. Slide the moveable rear stop 512 into the engaging position as illustrated by movement 410 in FIG. 12 and resulting in the placement of FIG. 13.

13. Rotate the cutting handle assembly 340 about the pivot 338 (see FIG. 24) until the cut depth limiting features 372 engage the elevation control surface 374 (see FIGS. 15 and 26) as illustrated by movement 408 in FIG. 12 and resulting in the placement of FIGS. 13 through 15. This movement initiates two cuts 290 into the jacket 230, optionally including the buffer tube 222, of the fiber optic cable 220.

14. Maintaining the cutting handle assembly 340 in the position of Step 13, slide the cutting head assembly 330 rearward along the slide rail 506 until the cut length limiting feature 384 engages a pad 514 of the moveable rear stop 512 as illustrated by movement 412 in FIG. 13 and resulting in the placement of FIG. 16. This movement completes the cuts 290 into the jacket 230, optionally including the buffer tube 222, of the fiber optic cable 220.

15. Rotate the cutting handle assembly 340 about the pivot 338 until the detent 358 engages the detent pocket 356 (see FIG. 24) as illustrated by movement 414 in FIG. 16 and resulting in the placement of FIG. 17.

16. Slide the moveable rear stop 512 into the non-engaging position as illustrated by movement 416 in FIG. 16 and resulting in the placement of FIG. 17.

17. Slide the cutting head assembly 330 rearward along the slide rail 506 until the cut length limiting feature 384 engages the fixed rear stop 510 as illustrated by movement 417 in FIG. 17 and resulting in the placement of FIG. 18.

18. Remove the cable holder cap 310 from the cable holder 504 as illustrated by movement 418 in FIG. 18 and resulting in the approximate placement of FIG. 19.

19. Remove the fiber optic cable 220 from the cable holder channel 324 of the cable holder insert 320 as illustrated by movement 419 in FIG. 18 and resulting in the approximate placement of FIG. 19.

The steps listed above place two cuts 290 through the jacket 230, optionally including the buffer tube 222, of the fiber optic distribution cable 220. The cuts are of length L spaced a distance $D_1$ apart as shown in FIG. 20 and define a cut-away strip 292. The above steps partially prepare a cut region 270 for use with a break-out assembly 200 as shown in FIG. 6. The remaining steps to prepare the cut region 270 are listed farther below.

A preferred method of using the example cable access tool 300' including the cutting handle assembly 340' with single cutting blade 344 (see FIGS. 28 through 30) includes the following steps:

1. Remove the cable holder cap 310' from the cable holder 504', if necessary.

2. Place the fiber optic distribution cable 220 within the cable holder 504' as shown in FIG. 29.

3. Orient the distribution cable 220 such that the strength members 226 as shown in FIG. 2 and/or the ripcords 232 as shown in FIG. 3 will not intersect the cutting paths of the cutting blade 344 nor lie between the cutting blade 344 paths.

4. Place and secure the cable holder cap 310' on the cable holder 504' as shown in FIGS. 29 and 30.

5. Align the cut guide features 350 of the cutting handle assembly 340' and the blade access slot 376 of the cable holder cap 310' placing the cut guide features 350 within the blade access slot 376 but keeping the cutting blade 344 above the fiber optic cable 220.

6. Slide the cutting handle assembly 340' along the blade access slot 376 moving the cut length limiting feature 382' toward the first end 375 of the blade access slot 376 until they contact.

7. Plunge the cutting blade 344 through the jacket 230, optionally including the buffer tube 222, of the fiber optic cable 220 initiating a first cut $290_1$ into the jacket 230. Continue the plunge until the cut depth limiting features 372' fully rest against the elevation control surface 374'.

8. Maintaining the cutting handle assembly 340' at the depth of Step 7, slide the cutting handle assembly 340' rearward along the blade access slot 376 until the cut length limiting feature 384' engages the second end 377 of the blade access slot 376. This movement completes the first cut 290₁ into the jacket 230, optionally including the buffer tube 222, of the fiber optic cable 220 (see FIG. 20).

9. Vertically remove the cutting handle assembly 340' from the cable holder cap 310' and rotate it 180 degrees about a vertical axis.

10. Align the cut guide features 350 of the cutting handle assembly 340' and the blade access slot 376 of the cable holder cap 310' placing the cut guide features 350 within the blade access slot 376 but keeping the cutting blade 344 above the fiber optic cable 220. Use an orientation of the cutting handle assembly 340' opposite of that used in Step 5.

11. Slide the cutting handle assembly 340' along the blade access slot 376 moving the cut length limiting feature 382' toward the second end 377 of the blade access slot 376 until they contact.

12. Plunge the cutting blade 344 through the jacket 230, optionally including the buffer tube 222, of the fiber optic cable 220 initiating a second cut 290₂ into the jacket 230. Continue the plunge until the cut depth limiting features 372' fully rest against the elevation control surface 374'.

13. Maintaining the cutting handle assembly 340' at the depth of Step 12, slide the cutting handle assembly 340' rearward along the blade access slot 376 until the cut length limiting feature 384' engages the first end 375 of the blade access slot 376. This movement completes the second cut 290₂ into the jacket 230, optionally including the buffer tube 222, of the fiber optic cable 220 (see FIG. 20).

14. Vertically remove the cutting handle assembly 340' from the cable holder cap 310'.

15. Remove the cable holder cap 310' from the cable holder 504'.

16. Remove the fiber optic distribution cable 220 from the cable holder 504'.

The steps listed above place two cuts 290₁, 290₂ through the jacket 230, optionally including the buffer tube 222, of the fiber optic distribution cable 220. The cuts are of length L spaced a distance D₁ apart as shown in FIG. 20 and define a cut-away strip 292. The above steps partially prepare a cut region 270 for use with a break-out assembly 200 as shown in FIG. 6. The remaining steps to prepare the cut region 270 are listed below.

Following preparation of the fiber optic distribution cable 220 by either of the two methods above, the cable 220 is in a condition illustrated by FIG. 20, as mentioned above. A preferred method to further prepare the cut region 270 for use with a break-out assembly 200 includes removing the cut-away strip 292. The cut-away strip 292 includes a portion of the jacket 230 and may optionally include a portion of the buffer tube 222. A preferred method of removing the cut-away strip 292 includes:

1. Bend the fiber optic cable 220 of FIG. 20 as shown in FIG. 21 causing the cut-away strip 292 to outwardly buckle. Simultaneously pull outwardly on the cut-away strip 292, if necessary.

2. Push away/spread the outer strength layer structure 234 away from the cut region 270 to gain clear access to the buffer tube 222 (see FIGS. 2 and 21 through 23).

3. Slide a suitable knife (not shown) between the cut-away strip 292 and the fiber optic cable 220 while keeping the outer strength layer structure 234 away from the cut region 270.

4. Cut the cut-away strip 292 at a first end 272 of the cut region 270 (see FIG. 23).

5. Cut the cut-away strip 292 at a second end 274 of the cut region 270 (see FIG. 23).

The steps listed above create the cut region 270 for use with the break-out assembly 200 as shown in FIG. 6.

The above methods may be automated by applying actuators, sensors, and control systems as are known in the art. For example, a pneumatic actuator may be placed across the pivot joint 338 connecting the cutting head assembly 330 and the cutting handle assembly 340 (see FIG. 24). The rotational position of the cutting handle assembly 340 may be monitored by a sensor. An additional actuator may be placed across the slide rail 506 connecting the base 502 and the cutting head assembly 330. The linear position of the cutting head assembly 330 may be monitored by an additional sensor. The above sensors may provide positional information to a control system which may control the actuators. The control system may be programmable. An operator may replace the control system.

The above methods may be modified to allow for multiple cutting passes over the same cut(s) 290, 290₁, 290₂. Depending on the toughness of the jacket 230 and the buffer tube 222; the sharpness of the cutting blade(s) 344; and the strength of the operator (or actuator), a single cutting pass may not successfully form the cut-away strip 292. In this case, it may be desirable to reduce the penetration of the cutting blade(s) 344 into the jacket 230 (optionally including the buffer tube 222). A second cutting pass, with increased penetration, follows the first. Multiple cutting passes may follow as necessary, each with increased cutting blade(s) 344 penetration. The cutting blade(s) 344 penetration of the final (deepest) cutting pass is limited as discussed above, preventing damage to the fibers $224_{rdc}$, $224_{sdc}$.

In addition to the fiber optic distribution cable 220, the cable access tool of the present disclosure may be adapted for use with other optical cables. Furthermore, the cable access tool may be adapted for use with other cables and conduits including electrical cables.

The above specification provides examples of how certain aspects may be put into practice. It will be appreciated that the aspects can be practiced in other ways than those specifically shown and described herein without departing from the spirit and scope of the aspects of the present disclosure.

What is claimed is:

1. A cable access tool for preparing a break-out location on a jacket of a cable comprising:
   a cable holder including a base plate and a cable holder channel sized to hold and locate the cable;
   a cable holder cap including a blade access slot and at least one cable locating feature, sized to hold and locate the cable, the cable holder cap being removably mounted to the cable holder, and the blade access slot having a first end and an opposite second end;
   at least one cutting blade fixedly mounted to a cutting handle assembly, the cutting handle assembly fixedly mounting at least one cut depth limiter, the at least one cutting blade slidable along the blade access slot; and
   a cut length limiter defining a starting position and an ending position of the at least one cutting blade along the blade access slot;
   wherein the at least one cutting blade is generally parallel with the blade access slot and passes through the blade access slot when in a cutting configuration;
   wherein the at least one cutting blade penetrates the jacket of the cable when in the cutting configuration, the cut depth limiter limiting a depth of the cutting configuration; and
   wherein the cut length limiter limits a location of the at least one cutting blade along the blade access slot when in the cutting configuration, the location bounded by the starting position and the ending position.

2. The cable access tool of claim 1, wherein the cut length limiter comprises an aft stop feature and a fore stop feature fixedly mounted to the cutting handle assembly, the aft stop feature engaging the first end of the blade access slot when the at least one cutting blade is at the starting position, and the fore stop feature engaging the second end of the blade access slot when the at least one cutting blade is at the ending position.

3. The cable access tool of claim 2, wherein the aft stop feature also engages the second end of the blade access slot when the at least one cutting blade is at a second starting position, and the fore stop feature also engages the first end of the blade access slot when the at least one cutting blade is at a second ending position.

4. The cable access tool of claim 1, wherein the cut depth limiter engages the jacket of the cable when limiting the depth of the cutting configuration.

5. The cable access tool of claim 4, wherein the cut depth limiter further functions as a cutting blade stabilizer.

6. The cable access tool of claim 1, wherein the cut depth limiter engages an elevation control surface of the cable holder cap when limiting the depth of the cutting configuration.

7. The cable access tool of claim 6, wherein the cut depth limiter further functions as a cutting blade stabilizer.

8. The cable access tool of claim 1, further comprising a linear slide rail, the linear slide rail fixedly mounted to the cable holder;
    a cutting head assembly slidably mounted to the linear slide rail; and
    the cutting handle assembly pivotally mounted to the cutting head assembly.

9. The cable access tool of claim 8, wherein the cut length limiter comprises a fixed first bumper, fixedly mounted to the base plate, and a moveable second bumper, slidably mounted to the base plate; and
    a first stop feature and a second stop feature fixedly mounted to the cutting head assembly, the first stop feature engaging the fixed first bumper when the at least one cutting blade is at the starting position, and the second stop feature engaging the moveable second bumper when the at least one cutting blade is at the ending position and the moveable second bumper is in an engaging position.

10. The cable access tool of claim 9, wherein the cut depth limiter engages an elevation control surface of the cable holder cap when limiting the depth of the cutting configuration.

11. The cable access tool of claim 9, wherein the cutting head assembly is moveable to and from a cable loading and unloading position when the moveable second bumper is in a non-engaging position.

* * * * *